US010423204B2

(12) United States Patent
Allen-Ware et al.

(10) Patent No.: US 10,423,204 B2
(45) Date of Patent: Sep. 24, 2019

(54) ENFORCING POWER CAPS ON COMPUTING DEVICES WITH MULTIPLE POWER FEEDS

(71) Applicant: International Business Machines Corporation, Armonk, NY (US)

(72) Inventors: Malcolm S. Allen-Ware, Tucson, AZ (US); Charles R. Lefurgy, Austin, TX (US); Yang Li, Pittsburgh, PA (US); Karthick Rajamani, Austin, TX (US); Guillermo J. Silva, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 15/459,719

(22) Filed: Mar. 15, 2017

(65) Prior Publication Data
US 2018/0267585 A1 Sep. 20, 2018

(51) Int. Cl.
*G06F 1/32* (2019.01)
*G06F 1/26* (2006.01)
*G06F 1/324* (2019.01)
*G06F 1/3296* (2019.01)
*G06F 1/3203* (2019.01)
*G06F 11/30* (2006.01)

(52) U.S. Cl.
CPC ............ *G06F 1/263* (2013.01); *G06F 1/3203* (2013.01); *G06F 1/324* (2013.01); *G06F 1/3296* (2013.01); *G06F 11/3062* (2013.01)

(58) Field of Classification Search
CPC ........ G06F 1/263; G06F 1/3296; G06F 1/324; G06F 1/3203
See application file for complete search history.

(56) References Cited

U.S. PATENT DOCUMENTS

| 5,650,715 A | 7/1997 | Massie et al. |
| 7,702,931 B2 | 4/2010 | Goodrum et al. |
| 7,895,455 B2 | 2/2011 | Green et al. |
| 8,742,624 B1 | 6/2014 | Sagarwala et al. |

(Continued)

OTHER PUBLICATIONS

List of IBM Patents or Patent Applications Treated as Related, May 1, 2017, 2 pages.

(Continued)

*Primary Examiner* — Fahmida Rahman
(74) *Attorney, Agent, or Firm* — Francis Lammes; Stephen J. Walder, Jr.; Mercedes L. Hobson

(57) ABSTRACT

A mechanism is provided for enforcing power caps within a power consumption device with multiple power supplies. Utilizing a minimum power error value from a set of error values, the minimum power error value is multiplied by a factor k to translate the minimum power error value to an internal power error value. The internal minimum power error value is multiplied by a number of working power supply units (M) of the power consumption device, resulting in an internal minimum power error value for multiple power supply units. The internal minimum power error value for the multiple power supply units is summed with a present power cap value thereby forming a summed power cap value. Responsive to the summed power cap value being between a power cap maximum and a power cap minimum, the computing load is throttled using the summed power cap value.

20 Claims, 14 Drawing Sheets

(56) References Cited

U.S. PATENT DOCUMENTS

| | | |
|---|---|---|
| 8,843,722 B2 | 9/2014 | Hormuth |
| 8,843,772 B2 | 9/2014 | Hormuth |
| 8,949,646 B1 | 2/2015 | Weber et al. |
| 9,261,945 B2 | 2/2016 | Khatri et al. |
| 9,712,080 B2 | 7/2017 | Phadke |
| 10,175,737 B1* | 1/2019 | Kong .................. G06F 1/30 |
| 2006/0082222 A1 | 4/2006 | Pincu et al. |
| 2008/0178019 A1 | 7/2008 | McGrane et al. |
| 2008/0320322 A1 | 12/2008 | Green et al. |
| 2010/0064150 A1 | 3/2010 | Higuchi |
| 2010/0332872 A1 | 12/2010 | Hanson et al. |
| 2011/0022245 A1 | 1/2011 | Goodrum et al. |
| 2011/0173468 A1 | 7/2011 | Egan et al. |
| 2011/0239010 A1 | 9/2011 | Jain et al. |
| 2011/0266867 A1 | 11/2011 | Schindler et al. |
| 2012/0017102 A1 | 1/2012 | Turicchi, Jr. et al. |
| 2012/0117390 A1 | 5/2012 | Arndt et al. |
| 2012/0324264 A1 | 12/2012 | Hanson et al. |
| 2013/0047006 A1 | 2/2013 | Brown et al. |
| 2013/0226362 A1 | 8/2013 | Jagadishprasad et al. |
| 2013/0283068 A1 | 10/2013 | Li et al. |
| 2013/0318371 A1 | 11/2013 | Hormuth |
| 2013/0339776 A1 | 12/2013 | Jagadishprasad et al. |
| 2013/0346969 A1 | 12/2013 | Shanmuganathan et al. |
| 2014/0310537 A1 | 10/2014 | Messick et al. |
| 2015/0121113 A1 | 4/2015 | Ramamurthy et al. |
| 2015/0177814 A1 | 6/2015 | Bailey et al. |
| 2015/0381237 A1 | 12/2015 | Griffith |
| 2016/0162018 A1 | 6/2016 | Rahardjo et al. |
| 2016/0179173 A1* | 6/2016 | Eastep .................. G06F 1/3206 713/320 |
| 2016/0357243 A1* | 12/2016 | Dorsey .................. G06F 1/3296 |
| 2016/0363918 A1* | 12/2016 | Einfalt .................. G05B 19/042 |

OTHER PUBLICATIONS

Fan, Xiaobo et al., "Power Provisioning for a Warehouse-sized Computer", in Proceedings of the ACM International Symposium on Computer Architecture, San Diego, CA, Jun. 2007, 11 pages.

Raghavendra, Ramya et al, "No "Power" Struggles: Coordinated Multi-level Power Management for the Data Center", ACM, ASPLOS'08, Seattle, Washington, Mar. 1-5, 2008, 12 pages.

* cited by examiner

ENFORCING POWER CAPS ON COMPUTING DEVICES WITH MULTIPLE POWER FEEDS

BACKGROUND

The present application relates generally to an improved data processing apparatus and method and more specifically to mechanisms for enforcing power caps on computing devices with multiple power feeds.

A data center is a facility used to house computing devices and associated components, such as servers, telecommunication devices, storage systems, or the like. A data center can occupy one room of a building, one or more floors, or an entire building. Most of the equipment is often in the form of servers mounted in rack cabinets, which are usually placed in single rows forming corridors (so-called aisles) between them. This aisle configuration allows people access to the front and rear of each cabinet. Servers differ greatly in size from one shelf space (1 U) servers to large freestanding storage silos, which may occupy many square feet of floor space. Some equipment such as mainframe computers and storage devices are often as big as the rack cabinets themselves and are placed alongside the rack cabinets.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for enforcing power caps within a power consumption device with multiple power supplies. The illustrative embodiment, utilizing a minimum power error value from a set of error values, multiplies the minimum power error value by a factor k to translate the minimum power error value to an internal power error value. The illustrative embodiment multiplies the internal minimum power error value by a number of working power supply units (M) of the power consumption device, resulting in an internal minimum power error value for multiple power supply units. The illustrative embodiment sums the internal minimum power error value for the multiple power supply units with a present power cap value thereby forming a summed power cap value. The illustrative embodiment throttles the computing load using the summed power cap value in response to the summed power cap value being between a power cap maximum and a power cap minimum.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
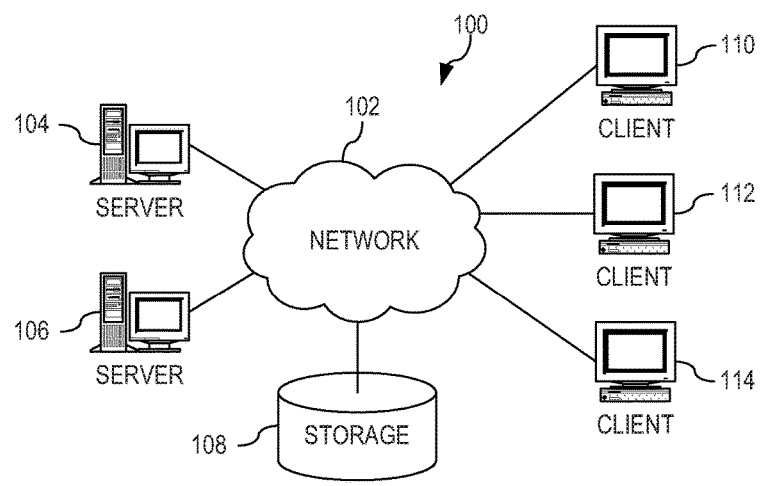
FIG. 1 is an example diagram of a distributed data processing system in which aspects of the illustrative embodiments may be implemented.

As stated previously, data centers are facilities used to house computing devices and associated components, such as servers, telecommunication devices, storage systems, or the like. Each of the computing devices within these data centers consume power and, no matter how efficiently data centers are managed, data centers are expanding at an alarming rate and consuming increasing amounts of power. Currently, data centers pay high infrastructure cost and in order to meet service level agreements, the data centers implement a conventional power capping solution with a conservative infrastructure deployment in order not to risk power failure. In one instance, a well-known data center implemented a power capping solution that only utilized 72% of peak power. In instances such as this one, the data centers treat all of the power consumption devices within as if they are governed by a single power controller. However, power distribution is a hierarchy of transformers, switchgear, distribution panels, and power strips and current power capping solutions fail to take into consideration this power distribution hierarchy and associated characteristics when assigning power caps.

The illustrative embodiments provide mechanisms that allocate data center power to power consumption devices with multiple power supplies more efficiently than conventional power capping solutions. The mechanisms provide a unique power capping solution that utilizes a power distribution hierarchy and associated characteristics as well as the priority assigned to each power consumption device to throttle the power consumption devices to adhere to design limitations of power distribution equipment or contractual limits. However, since many power consumption devices utilize dual power feeds for resiliency, normal operations only persist when both power supplies and their power feeds are in operating correctly. Yet, when a power consumption device fails to operate efficiently, such as when power supply fails, a power feed fails, or the like, thereby drawing power that is not equal to the other power supply, power becomes stranded. That is, power consumption devices utilize dual power feeds utilize power up to the lesser of a maximum provided by one of the two power supplies. For example, if both power of an A power supply and a B power supply are normally budgeted 300 Watts but, because of a deficiency, the B power supply is operating inefficiently at only 200 Watts and is thus budgeted for 200 Watts, then even if the A power supply is operating efficiently and is allocated 300 Watts, it can only use 200 Watts due to the inefficiency of the B power supply. Thus, the unused 100 Watts allocated to the A power supply becomes a wasted power budget allocation.

Therefore, the illustrative embodiments provide mechanisms that allocate data center power to the power consumption devices with multiple power supplies more efficiently than conventional power capping solutions. That is, previous implementations provide a unique power capping solution that utilizes the power distribution hierarchy and associated characteristics as well as the priority assigned to a power consumption device with one power supply in order to throttle the power consumption devices to adhere to design limitations of power distribution equipment or contractual limits. However, the mechanisms of the illustrative embodiments compute additional metrics that correspond to the amount of stranded power on power consumption devices with multiple power supplies and calculate the precise amount of power that may be reallocated before the power consumption devices receive and set their respective power caps, thereby resulting in an optimized power allocation.

Additionally, the mechanisms of the illustrative embodiments take the allocated power budgets from each of the multiple power supplies and, when the power consumption device being fed by the multiple power supplies has multiple subcomponents, such as blades, sleds, or the like, divides the allocated power budgets among the subcomponents. That is, the mechanisms using the provided power budgets or power caps as inputs and determines appropriate power caps to apply to each subcomponent in the power consumption device, which results in each power supply running at or lower than their associated power budget.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

The present description and claims may make use of the terms "a", "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
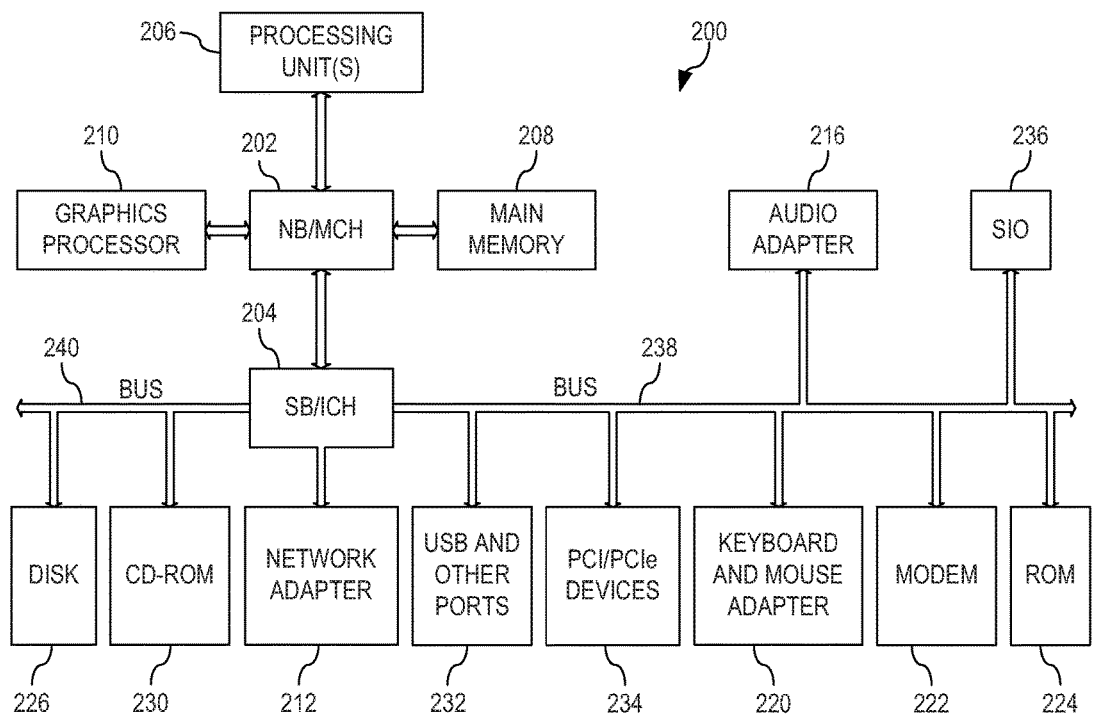
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104 may be specifically configured to implement a power capping for computing device with multiple power supplies. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, and software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates power capping for computing device with multiple power supplies.

As noted above, the mechanisms of the illustrative embodiments utilize specifically configured computing devices, or data processing systems, to perform the operations for power capping for computing device with multiple power supplies. These computing devices, or data processing systems, may comprise various hardware elements, which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the power capping for computing device with multiple power supplies.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. In addition, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Again, the illustrative embodiments utilize a power distribution hierarchy and associated characteristics of the data center as well as the priority assigned to each power consumption device in the data center to throttle the power consumption devices to adhere to design limitations of power distribution equipment or contractual limits. However, since data centers are often populated with power consumption devices with multiple power supplies, the illustrative embodiments compute additional metrics that correspond to the amount of stranded power on the power consumption devices with multiple power supplies and calculate the precise amount of power that may be reallocated before the power consumption devices receive and set their respective power caps, thereby resulting in an optimized power allocation.

Figure 3:
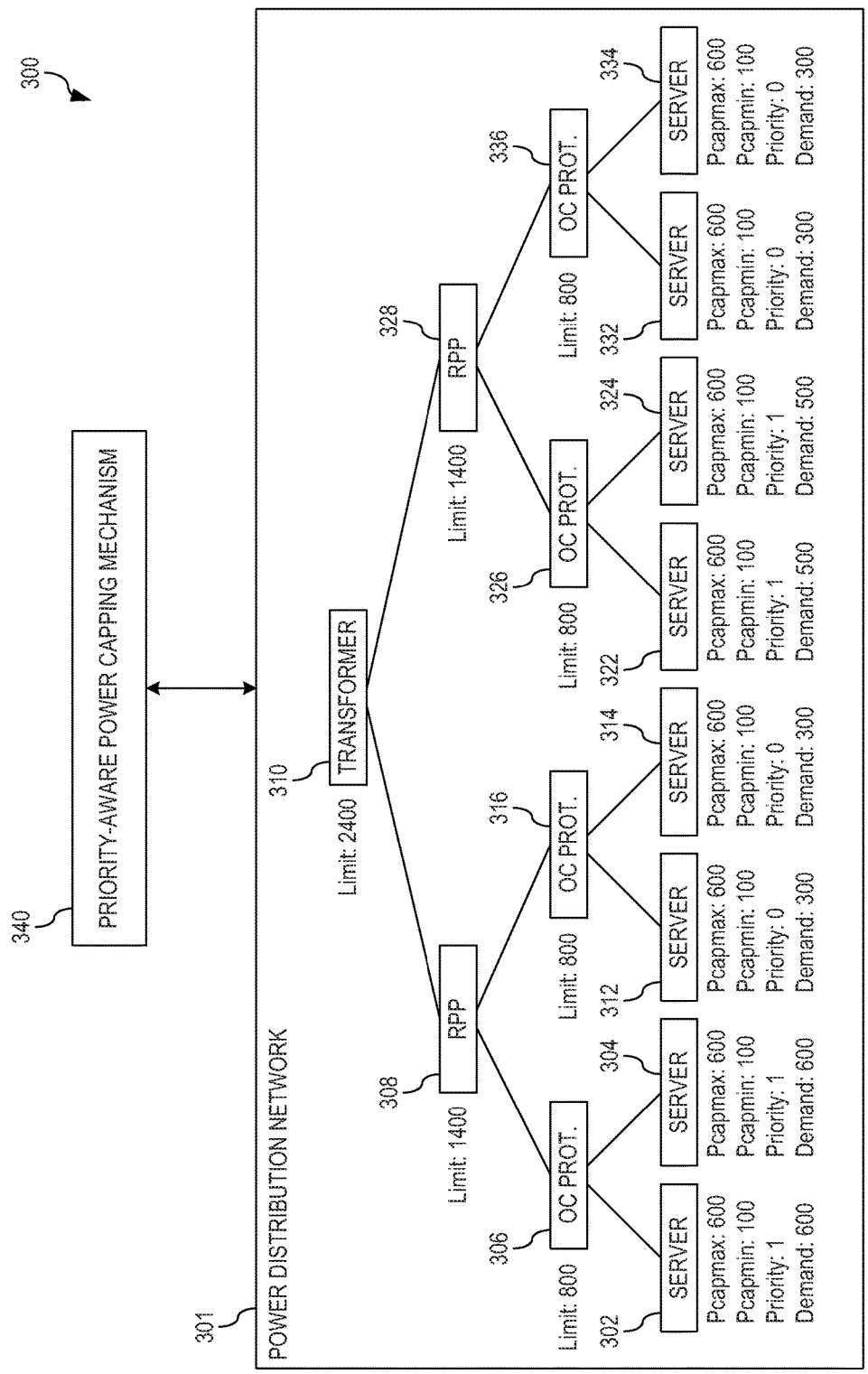
FIG. 3 depicts a functional block diagram of a mechanism for priority-aware power capping for hierarchical power distribution networks in accordance with an illustrative embodiment.

FIG. 3 depicts a functional block diagram of a mechanism for priority-aware power capping for hierarchical power distribution networks in accordance with an illustrative embodiment. This mechanism operates to determine an initial power budget for each power controller/server within data center 300. The following description utilizes servers as an exemplary computer system within data center 300; however, utilizes servers is only for the example and the illustrative embodiments recognize that any type of computing resource may be utilized within data center 300, such as servers, telecommunication devices, storage systems, or the like. As noted previously, servers are normally fed by two power sources: an A-side power source and a B-side power source. The following illustrates the power budget determinations that are performed for each of the two power sources.

As illustrated, data center 300 comprises power distribution network 301 that comprises a set of power consumption devices, i.e. a set of servers 302, 304, 312, 314, 322, 324, 332, and 334. In power distribution network 301, servers 302 and 304 are coupled to overcurrent protection device 306, servers 312 and 314 are coupled to overcurrent protection device 316, servers 322 and 324 are coupled to overcurrent protection device 326, and servers 332 and 334 are coupled to overcurrent protection device 336. As is further illustrated, in power distribution network 301, overcurrent protection devices 306 and 316 are coupled to remote power panel (RPP) 308 and overcurrent protection devices 326 and 336 are coupled to RPP 328. Finally, in power distribution network 301, RPPs 308 and 328 are coupled to transformer 310, which is the main point of entry for electricity into power distribution network 301 of data center 300. While power distribution network 301 is only depicted as comprising a hierarchy of servers, overcurrent protection devices, RPPs, and a transformer, the illustrative embodiments recognize that many other devices may exist in the hierarchy, such as sub-transformers, switchgears, power strips, or the like.

Associated with each device, i.e. each of servers 302, 304, 312, 314, 322, 324, 332, and 334; overcurrent protection devices 306, 316, 326, and 336; RPPs 308 and 328; and transformer 310, are a set of characteristics, such as priority, demand, minimum power cap per priority, maximum power cap per priority, limit, or the like. In normal use, servers 302, 304, 312, 314, 322, 324, 332, and 334 will have an associated priority, demand, minimum power cap per priority, and maximum power cap per priority, while overcurrent protection devices 306, 316, 326, and 336; RPPs 308 and 328; and transformer 310 will have an associated limit. Priority is the assignment associated with the device signifying an importance of the device and may be represented by an integer value, for example from 0 to 10 with 10 being the highest priority and 0 being the lowest priority. Demand refers to the power that the device currently desires to consume without enforcing any power caps. Minimum power cap (Pcapmin) refers to the lowest power cap under which the device may operate. Maximum power cap (Pcapmax) refers to the largest possible power cap under which the device may operate, i.e. the largest possible power consumption of the device. Limit refers to the power limit of a power device.

Figure 4:
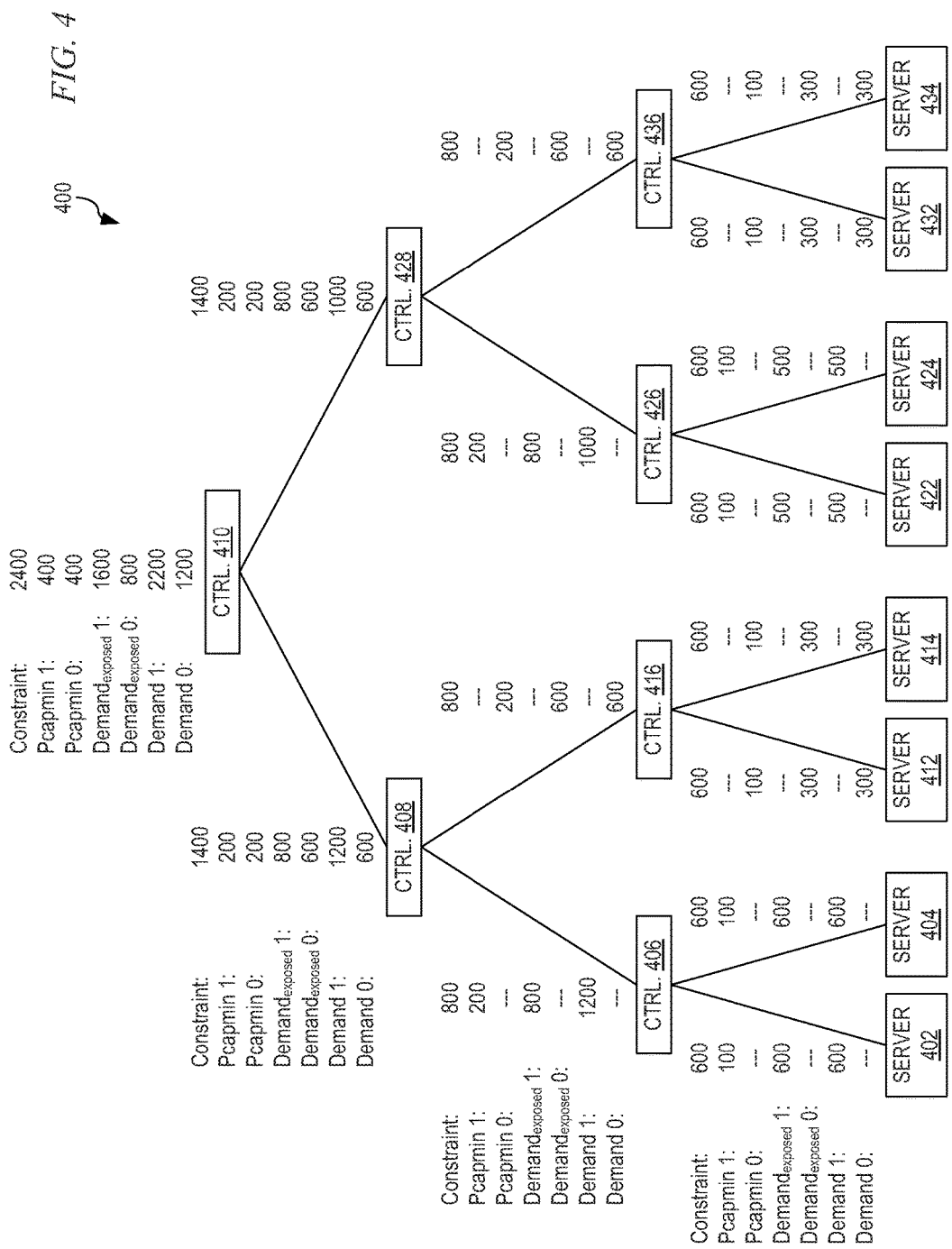
FIG. 4 illustrates determined metrics for each power controller/server in accordance with an illustrative embodiment.

In accordance with the illustrative embodiments, priority-aware power capping mechanism 340 mirrors each power distribution device, i.e. overcurrent protection devices 306, 316, 326, and 336; RPPs 308 and 328; and transformer 310 with a power controller, as is illustrated in FIG. 4 in accordance with an illustrative embodiment. As is depicted in FIG. 4, in power distribution network 400, servers 402, 404, 412, 414, 422, 424, 432, and 434 are power consumption devices that mirror servers 302, 304, 312, 314, 322, 324, 332, and 334 of FIG. 3. As is further depicted in FIG. 4, in power distribution network 400, power controllers 406, 416, 426, and 436 mirror the power distribution devices of overcurrent protection devices 306, 316, 326, and 336 of FIG. 3; power controllers 408 and 428 mirror the power distribution device of RPPs 308 and 328 of FIG. 3; and power controller 410 mirrors the power distribution device of transformer 310 of FIG. 3.

In the illustrative embodiments, in a bottom-up process, priority-aware power capping mechanism 340 summarizes metrics for each server and power controller based on the metrics of any down-stream device(s) and, in a top-down process, assigns power budgets to each power controller/power consumption device based on a determined power budget that takes into consideration the priority of the power consumption devices. Using the characteristics obtained from each of servers 302, 304, 312, 314, 322, 324, 332, and 334; overcurrent protection devices 306, 316, 326, and 336; RPPs 308 and 328; and transformer 310, in the bottom-up process, for each of servers 402, 404, 412, 414, 422, 424, 432, and 434 as well as power controllers 406, 408, 410, 416, 426, 428, and 436, priority-aware power capping mechanism 340 initially summarizes metrics, for example, in Watts, Amps, or the like, for each server/power controllers based on the associated characteristics. These metrics include:

Constraint: The maximum amount of power that is allowed to flow through the power controller/server and the power controllers/servers downwards.

For any priority j of the power controller/server:
Minimum power cap per priority (Pcapmin j): The minimum power budget that the power controller/server requires to receive for the priority.

Exposed power demand per priority ($Demand_{exposed}$ j): The power demand that the power controller/server exposes to its parent power controller for the priority.

Power demand per priority (Demand j): For a power controller, the total power demand that the servers with the priority under the power controller desire to utilize. For a server, the power demand is the power consumption of the server when power capping is not enforced.

With respect to servers 402, 404, 412, 414, 422, 424, 432, and 434, priority-aware power capping mechanism 340 summarizes the metrics for each server using one or more of the following equations as follows:

Constraint=Pcapmax

Pcapmin j=Pcapmin $Demand_{exposed}$j=max{Demand,Pcapmin}

Demand j=max{Demand,Pcapmin} where Demand refers to the power that the device currently consumes without enforcing any power caps, Pcapmin refers to the lowest power cap that the device can operate under, Pcapmax refers to the largest possible power cap that the device can operate under, i.e. the maximum power consumption for the server, and j is the instant priority being considered.

In order to provide an example of how these determinations would be conducted, using the exemplary individual characteristics associated with servers 302 and 304 from FIG. 3, for each of servers 402 and 404, priority-aware power capping mechanism 340 would determine:

Constraint=Pcapmax=600

Pcapmin 1=Pcapmin=100

$Demand_{exposed}$ 1=max{Demand,Pcapmin}=max{600, 100}=600

Demand 1=max{Demand,Pcapmin}=max{600, 100}=600.

Using the exemplary individual characteristics associated with servers 312, 314, 332, and 334 from FIG. 3, for each of servers 412, 414, 432, and 434, priority-aware power capping mechanism 340 would determine:

Constraint=Pcapmax=600

Pcapmin 0=Pcapmin=100

$Demand_{exposed}$ 0=max{Demand,Pcapmin}=max{300, 100}=300

Demand 0=max{Demand,Pcapmin}=max{300, 100}=300.

Using the exemplary individual characteristics associated with servers 322 and 324 from FIG. 3, for each of servers 422 and 424, priority-aware power capping mechanism 340 would determine:

Constraint=Pcapmax=600

Pcapmin 1=Pcapmin=100

Demand$_{exposed}$ 1=max{Demand,Pcapmin}=max{500, 100}=500

Demand 1=max{Demand,Pcapmin}=max{500, 100}=500.

Then, with respect to each of power controllers 406, 408, 410, 416, 426, 428, and 436, priority-aware power capping mechanism 340 summarizes the metrics for each power controller using one or more of the following equations as follows:

$$\text{Constraint} = \min\left\{\text{Limit}, \sum_i \text{Constraint } ij\right\}$$

$$\text{Pcapmin } j = \sum_i \text{Pcapmin } ij$$

$$\text{Demand}_{exposed} \ j =$$
$$\min\left\{\text{limit} - \sum_{k<j} \text{Pcapmin } k - \sum_{k>j} \text{Demand}_{exposed} \ k, \ \sum_i \text{Demand}_{exposed} \ ij\right\}$$

$$\text{Demand } j = \sum_i \text{Demand } ij$$

where i is each child power controller/server below the power controller, j is the instant priority being considered, and k is all other priorities other than priority j being considered.

In order to provide an example of how these determinations would be conducted, using the determinations made for servers 402 and 404 as well as the exemplary individual characteristics associated with overcurrent protection device 306 from FIG. 3, for power controller 406, priority-aware power capping mechanism 340 would determine:

Constraint=min{Limit of power controller 406, Constraint of server 402+Constraint of server 404}=min{800, 600+600}=800

Pcapmin 1=Pcapmin 1 of server 402+Pcapmin 1 of server 404=100+100=200

Demand$_{exposed}$ 1=min{Limit of power controller 406, Demand$_{exposed}$ 1 of server 402+Demand$_{exposed}$ 1 of server 404}=min{800, 600+600}=800

Demand 1=Demand 1 of server 402+Demand 1 of server 404=600+600=1200.

Using the determinations made for servers 412 and 414 as well as the exemplary individual characteristics associated with overcurrent protection device 316 from FIG. 3, for power controller 416, priority-aware power capping mechanism 340 would determine:

Constraint=min{Limit of power controller 416, Constraint of server 412+Constraint of server 414}=min{800, 600+600}=800

Pcapmin 0=Pcapmin 0 of server 412+Pcapmin 1 of server 414=100+100=200

Demand$_{exposed}$ 0=min{Limit of power controller 416, Demand$_{exposed}$ 0 of server 412+Demand$_{exposed}$ 0 of server 414}=min{800, 300+300}=600

Demand 0=Demand 0 of server 412+Demand 0 of server 414=300+300=600.

Using the determinations made for servers 422 and 424 as well as the exemplary individual characteristics associated with overcurrent protection device 326 from FIG. 3, for power controller 426, priority-aware power capping mechanism 340 would determine:

Constraint=min{Limit of power controller 426, Constraint of server 422+Constraint of server 424}=min{800, 600+600}=800

Pcapmin 1=Pcapmin 1 of server 422+Pcapmin 1 of server 424=100+100=200

Demand$_{exposed}$ 1=min{Limit of power controller 426, Demand$_{exposed}$ 1 of server 422+Demand$_{exposed}$ 1 of server 424}=min{800, 500+500}=800

Demand 1=Demand 1 of server 422+Demand 1 of server 424=500+500=1000.

Using the determinations made for servers 432 and 434 as well as the exemplary individual characteristics associated with overcurrent protection device 336 from FIG. 3, for power controller 436, priority-aware power capping mechanism 340 would determine:

Constraint=min{Limit of power controller 436, Constraint of server 432+Constraint of server 434}=min{800, 600+600}=800

Pcapmin 0=Pcapmin 0 of server 432+Pcapmin 1 of server 434=100+100=200

Demand$_{exposed}$ 0=min{Limit of power controller 436, Demand$_{exposed}$ 0 of server 432+Demand$_{exposed}$ 0 of server 434}=min{800, 300+300}=600

Demand 0=Demand 0 of server 432+Demand 0 of server 434=300+300=600.

Using the determinations made for power controllers 406 and 416 as well as the exemplary individual characteristics associated with RPP 308 from FIG. 3, for power controller 408, priority-aware power capping mechanism 340 would determine:

Constraint=min{Limit of power controller 408, Constraint of power controller 406+Constraint of power controller 416}=min{1400, 800+800}=1400

Pcapmin 1=Pcapmin 1 of power controller 406=200

Pcapmin 0=Pcapmin 0 of power controller 416=200

Demand$_{exposed}$ 1=min{Limit of power controller 408−Pcapmin 0 of power controller 408, Demand$_{exposed}$ 1 of power controller 406}=min{1400−200, 800}=800

Demand$_{exposed}$ 0=min{Limit of power controller 408−Demand$_{exposed}$ 1 of power controller 408, Demand$_{exposed}$ 0 of power controller 416}=min{1400−800, 600}=600

Demand 1=Demand 1 of power controller 406=1200

Demand 0=Demand 0 of power controller 416=600.

Using the determinations made for power controllers 426 and 436 as well as the exemplary individual characteristics associated with RPP 328 from FIG. 3, for power controller 428, priority-aware power capping mechanism 340 would determine:

Constraint=min{Limit of power controller 428, Constraint of power controller 426+Constraint of power controller 436}=min{1400, 800+800)}=1400

Pcapmin 1=Pcapmin 1 of power controller 426=200

Pcapmin 0=Pcapmin 0 of power controller 436=200

$Demand_{exposed}$ 1=min{Limit of power controller 428−Pcapmin 0 of power controller 428, $Demand_{exposed}$ 1 of power controller 426}=min{1400−200, 800}=800

$Demand_{exposed}$ 0=min{Limit of power controller 428−$Demand_{exposed}$ 1 of power controller 428, $Demand_{exposed}$ 0 of power controller 436}=min{1400−800, 600}=600

Demand 1=Demand 1 of power controller 426=1000

Demand 0=Demand 0 of power controller 436=600.

Using the determinations made for power controllers 408 and 428 as well as the exemplary individual characteristics associated with transformer 310 from FIG. 3, for power controller 410, priority-aware power capping mechanism 340 would determine:

Constraint=min{Limit of power controller 410, Constraint of power controller 408+Constraint of power controller 428}=min{2400, 1400+1400}=2400

Pcapmin 1=Pcapmin 1 of power controller 408+Pcapmin 1 of power controller 428=200+200=400

Pcapmin 0=Pcapmin 0 of power controller 408+Pcapmin 0 of power controller 428=200+200=400

$Demand_{exposed}$ 1=min{Limit of power controller 410−Pcapmin 0 of power controller 410, $Demand_{exposed}$ 1 of power controller 408+$Demand_{exposed}$ 1 of power controller 428}=min{2400−400, 800+800}=1600

$Demand_{exposed}$ 0=min{Limit of power controller 410−$Demand_{exposed}$ 1 of power controller 410, $Demand_{exposed}$ 0 of power controller 408=$Demand_{exposed}$ 0 of power controller 428}=min{2400−1600, 600+600}=800

Demand 1=Demand 1 of power controller 408+Demand 1 of power controller 428=1200+1000=2200

Demand 0=Demand 0 of power controller 408+Demand 0 of power controller 428=600+600=1200.

With priority-aware power capping mechanism 340 determining the metrics for each of servers 402, 404, 412, 414, 422, 424, 432, and 434 as well as power controllers 406, 408, 410, 416, 426, 428, and 436 in the bottom-up process, priority-aware power capping mechanism 340 turns to the top-down process of assigning power budgets to each power controllers and eventually the power consumption devices for use as a throttling value when certain conditions are met based on a determined power budget. For each power controller 406, 408, 410, 416, 426, 428, and 436, priority-aware power capping mechanism 340 performs a three-step operation to determine the power budget assigned child power controllers/servers:

Assign minimum power budget by assigning the determined priority Pcapmin j to each child based on the child's priority.

Assign demanded power budget by, from high priority to low priority, at each priority. If the remaining power budget is enough to satisfy the remaining $Demand_{exposed}$ j of the priority, further assign each child its remaining $Demand_{exposed}$ j of the priority. If the remaining power budget fails to be enough to satisfy the remaining $Demand_{exposed}$ j of the priority, priority-aware power capping mechanism 340 utilizes a supplemental algorithm to break up the remaining power budget to each child, with the condition that each priority of each child does not receive a total power budget that exceeds its $Demand_{exposed}$ j of the priority. The supplemental algorithm may be, for example, an equal proportion algorithm, a high-demand cut-first algorithm, or the like. Equal proportion assigns a same percentage to all children nodes of their (remaining) demanded power (i.e. the amount of demand beyond Pcapmin) when the full demand cannot be satisfied. High-demand cut-first removes budget from the highest power consuming children nodes until they match lower power consuming children nodes, which is repeated until the power budget is acceptable.

If the remaining power budget is enough to satisfy the remaining $Demand_{exposed}$ j of the priority and there remains unassigned power from the power budget, assign the remaining unassigned power budget to each child, with the condition that each child does not receive a total power budget that exceeds its constraint using a supplemental algorithm, such as for example, an equal proportion algorithm, a high-demand cut-first algorithm, or the like.

Figure 5:
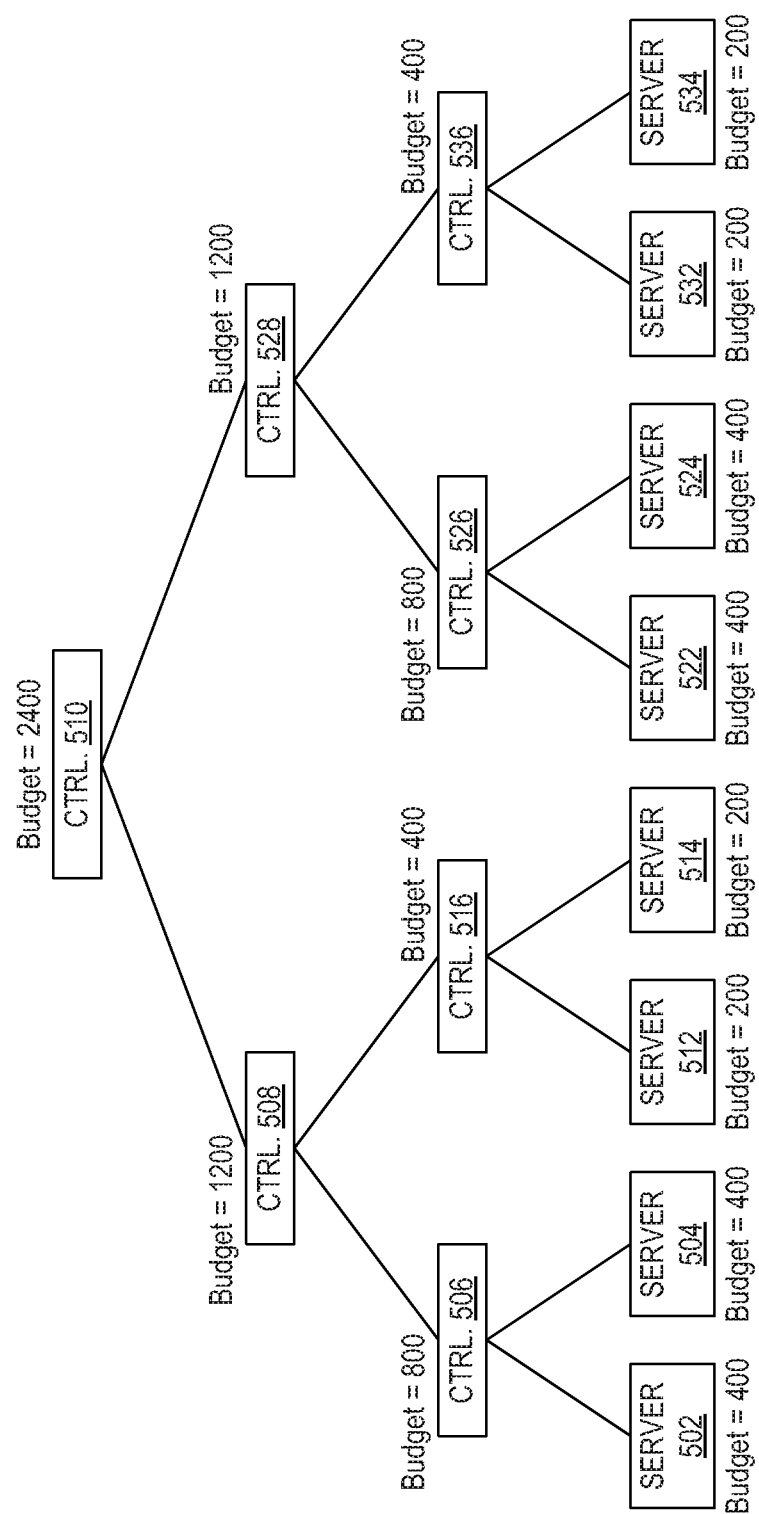
FIG. 5 illustrates assigned power budgets to each power controller/server in accordance with an illustrative embodiment.

Following these procedures, priority-aware power capping mechanism 340 determines the power budgets to each power controller/server, as is illustrated in FIG. 5 in accordance with an illustrative embodiment. As with FIG. 4, power distribution network 500 of FIG. 5 comprises servers 502, 504, 512, 514, 522, 524, 532, and 534 that are power consumption devices that mirror servers 302, 304, 312, 314, 322, 324, 332, and 334 of FIG. 3 as well as power controllers 506, 516, 526, and 536 that mirror the power distribution devices of overcurrent protection devices 306, 316, 326, and 336 of FIG. 3; power controllers 508 and 528 that mirror the power distribution device of RPPs 308 and 328 of FIG. 3; and power controller 510 that mirrors the power distribution device of transformer 310 of FIG. 3. In the example, an equal proportion algorithm is used as the supplemental algorithm, which distributes power proportionally to each child. In detail, for step 2, each child receives a power budget proportionally to the difference of its Demand j and Pcapmin j of the priority. Then for step 3, each child receives a power budget proportionally to the difference of its total Demand j and total Pcapmin j for all its priorities.

For example, using the exemplary metrics identified in FIG. 4 and the three-step operation identified above for power controller 510, priority-aware power capping mechanism 340 would determine:

|  | Remaining Budget | Budget of power controller 508 | | Budget of power controller 528 | |
| --- | --- | --- | --- | --- | --- |
|  |  | Priority 1 | Priority 0 | Priority 1 | Priority 0 |
| Step 1 | 2400 | 200 | 200 | 200 | 200 |
| Step 2 | 2400 − 200 − 200 − 200 − 200 = 1600 | 800 − 200 = 600 | (1600 − 600 − 600) * ((600 − 200)/((600 − 200) + (600 − 200))) = 200 | 800 − 200 = 600 | (1600 − 600 − 600) * ((600 − 200)/((600 − 200) + (600 − 200))) = 200 |
| Step 3 | 1600 − 600 − 200 − 600 − 200 = 0 | 0 | 0 | 0 | 0 |
| Total | 0 | 200 + 200 + 600 + 200 + 0 + 0 = 1200 | | 200 + 200 + 600 + 200 + 0 + 0 = 1200 | |

Using the exemplary metrics identified in FIG. 4 and the three operations identified above for power controller 508, priority-aware power capping mechanism 340 would determine:

|  | Remaining Budget | Budget of power controller 506 | | Budget of power controller 516 | |
| --- | --- | --- | --- | --- | --- |
|  |  | Priority 1 | Priority 0 | Priority 1 | Priority 0 |
| Step 1 | 1200 | 200 | — | — | 200 |
| Step 2 | 1200 − 200 − 200 = 800 | 800 − 200 = 600 | — | — | 800 − 600 = 200 |
| Step 3 | 800 − 600 − 200 = 0 | 0 | — | — | 0 |
| Total | 0 | 200 + 600 + 0 = 800 | | 200 + 200 + 0 = 400 | |

Using the exemplary metrics identified in FIG. 4 and the three operations identified above for power controller 528, priority-aware power capping mechanism 340 would determine:

|  | Remaining Budget | Budget of power controller 526 | | Budget of power controller 536 | |
| --- | --- | --- | --- | --- | --- |
|  |  | Priority 1 | Priority 0 | Priority 1 | Priority 0 |
| Step 1 | 1200 | 200 | — | — | 200 |
| Step 2 | 1200 − 200 − 200 = 800 | 800 − 200 = 600 | — | — | 800 − 600 = 200 |
| Step 3 | 800 − 600 − 200 = 0 | 0 | — | — | 0 |
| Total | 0 | 200 + 600 + 0 = 800 | | 200 + 200 + 0 = 400 | |

Using the exemplary metrics identified in FIG. 4 and the three operations identified above for power controller 506, priority-aware power capping mechanism 340 would determine:

|  | Remaining Budget | Budget of Server 502 | | Budget of Server 504 | |
| --- | --- | --- | --- | --- | --- |
|  |  | Priority 1 | Priority 0 | Priority 1 | Priority 0 |
| Step 1 | 800 | 100 | — | 100 | — |
| Step 2 | 800 − 100 − 100 = 600 | 600 * ((600 − 100)/((600 − 100) + (600 − 100))) = 300 | — | 600 * ((600 − 100)/((600 − 100) + (600 − 100))) = 300 | — |
| Step 3 | 600 − 300 − 300 = 0 | 0 | — | 0 | — |
| Total | 0 | 100 + 300 + 0 = 400 | | 100 + 300 + 0 = 400 | |

Using the exemplary metrics identified in FIG. 4 and the three operations identified above for power controller 516, priority-aware power capping mechanism 340 would determine:

|  | Remaining Budget | Budget of Server 512 | | Budget of Server 514 | |
|---|---|---|---|---|---|
|  |  | Priority 1 | Priority 0 | Priority 1 | Priority 0 |
| Step 1 | 400 | — | 100 | — | 100 |
| Step 2 | 400 − 100 − 100 = 200 | — | 200 * ((300 − 100)/((300 − 100) + (300 − 100))) = 100 | — | 200 * ((300 − 100)/((300 − 100) + (300 − 100))) = 100 |
| Step 3 | 200 − 100 − 100 = 0 | — | 0 | — | 0 |
| Total | 0 | 100 + 100 + 0 = 200 | | 100 + 100 + 0 = 200 | |

Using the exemplary metrics identified in FIG. 4 and the three operations identified above for power controller 526, priority-aware power capping mechanism 340 would determine:

|  | Remaining Budget | Budget of Server 522 | | Budget of Server 524 | |
|---|---|---|---|---|---|
|  |  | Priority 1 | Priority 0 | Priority 1 | Priority 0 |
| Step 1 | 800 | 100 | — | 100 | — |
| Step 2 | 800 − 100 − 100 = 600 | 600 * ((500 − 100)/((500 − 100) + (500 − 100))) = 300 | — | 600 * ((500 − 100)/((500 − 100) + (500 − 100))) = 300 | — |
| Step 3 | 600 − 300 − 300 = 0 | 0 | — | 0 | — |
| Total | 0 | 100 + 300 + 0 = 400 | | 100 + 300 + 0 = 400 | |

Using the exemplary metrics identified in FIG. 4 and the three operations identified above for power controller 526, priority-aware power capping mechanism 340 would determine:

|  | Remaining Budget | Budget of Server 532 | | Budget of Server 534 | |
|---|---|---|---|---|---|
|  |  | Priority 1 | Priority 0 | Priority 1 | Priority 0 |
| Step 1 | 400 | — | 100 | — | 100 |
| Step 2 | 400 − 100 − 100 = 200 | — | 200 * ((300 − 100)/((300 − 100) + (300 − 100))) = 100 | — | 200 * ((300 − 100)/((300 − 100) + (300 − 100))) = 100 |
| Step 3 | 200 − 100 − 100 = 0 | — | 0 | — | 0 |
| Total | 0 | 100 + 100 + 0 = 200 | | 100 + 100 + 0 = 200 | |

Figure 6A:
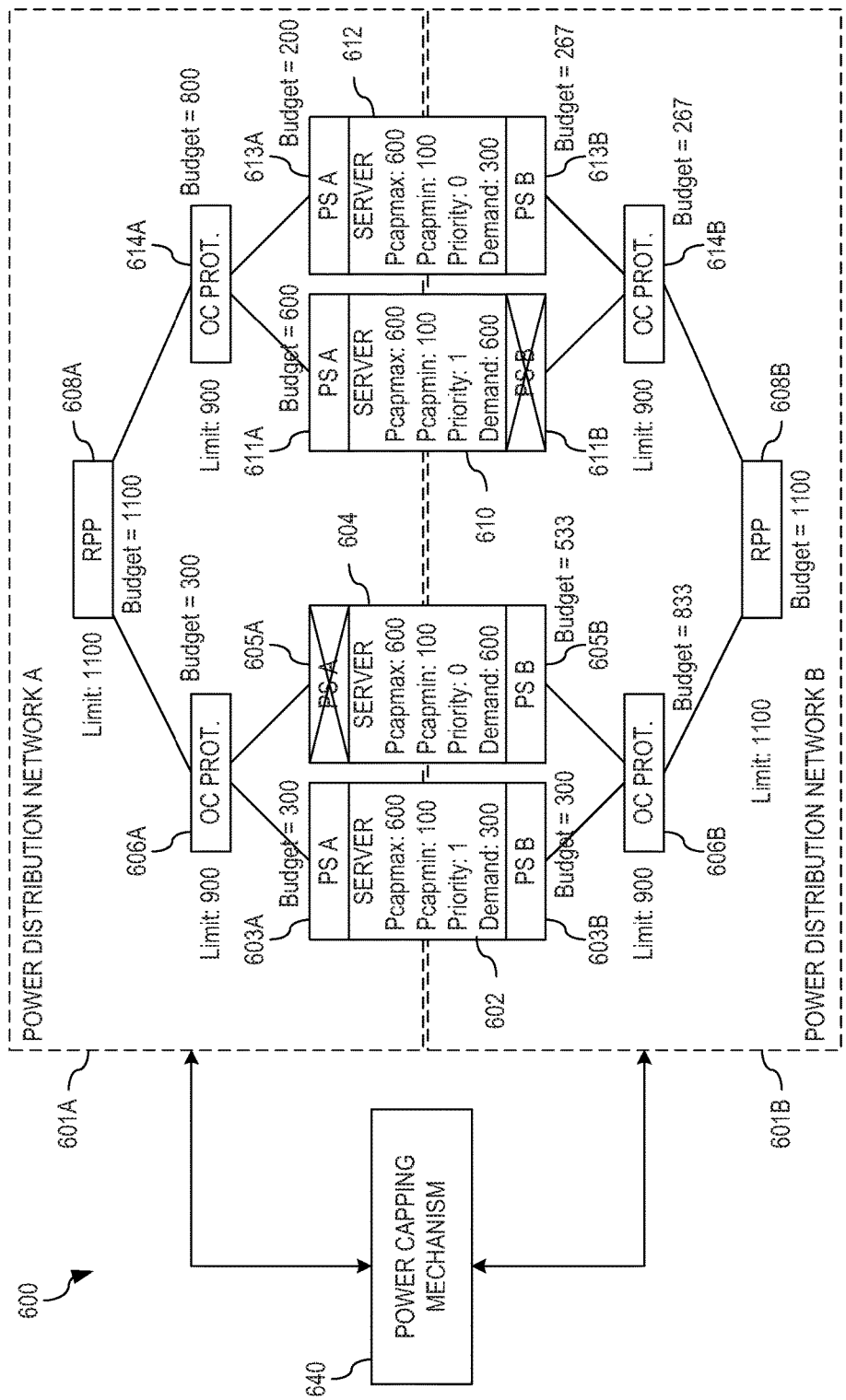
FIGS. 6A and 6B illustrates an event where two power supplies, each on a different server, have failed in accordance with an illustrative embodiment.

Again, the power budget determination illustrated in FIGS. 3-5 are performed for both power supplies that feed each of servers 302, 304, 312, 314, 322, 324, 332, and 334 that have power supplied that are operating under optimal conditions. However, in reality, power supplies often do not operate under normal operations and, when a power supply within a server is not operating efficiently, power may become stranded. For example, consider the simplified data center 600 in FIGS. 6A and 6B that illustrates an event where two power supplies, each on a different server, have failed in accordance with an illustrative embodiment. In FIG. 6A, simplified data center 600 comprises two distinction power distribution networks: power distribution network 601A and power distribution network 601B both of which are coupled to power capping mechanism 640. In power distribution network 601A, power supply 603A of server 602 and power supply 605A of server 604 are coupled to overcurrent protection device 606A and power supply 611A of server 610 and power supply 613A of server 612 are coupled to overcurrent protection device 614A. As is further illustrated, in power distribution network 601A, overcurrent protection devices 606A and 614A are coupled to remote power panel (RPP) 608A, which is further coupled to a transformer (not shown), that is the main point of entry for electricity into power distribution network 601A of data center 600.

In power distribution network 601B, power supply 603B of server 602 and power supply 605B of server 604 are coupled to overcurrent protection device 606B and power supply 611B of server 610 and power supply 613B of server 612 are coupled to overcurrent protection device 614B. As is further illustrated, in power distribution network 601B, overcurrent protection devices 606B and 614B are coupled to remote power panel (RPP) 608B, which is further coupled to a transformer (not shown) different from the transformer in power distribution network 601A, that is the main point of entry for electricity into power distribution network 601B of data center 600.

As with the example shown in FIG. 3, in FIG. 6A each of servers 602, 604, 610, and 612, overcurrent protection devices 606A, 606B, 614A, and 614B; and RPPs 608A and 608B have a set of characteristics, such as priority, demand, minimum power cap per priority, maximum power cap per priority, limit, or the like. In normal use, servers 602, 604, 610, and 612 will have an associated priority, demand, minimum power cap per priority, and maximum power cap per priority, while overcurrent protection devices 606A, 606B, 614A, and 614B and RPPs 608A and 608B will have an associated limit. Priority is the assignment associated with the device signifying an importance of the device and may be represented by an integer value, for example from 1 to 10 with 10 being the highest priority and 1 being the lowest priority. Demand refers to the power that the device currently desires to consume without enforcing any power caps. Minimum power cap (Pcapmin) refers to the lowest power cap under which the device may operate. Maximum power cap (Pcapmax) refers to the largest possible power cap under which the device may operate, i.e. the largest possible power consumption of the device. Limit refers to the power limit of a power device.

In the example illustrated in FIG. 6A, each of servers 602, 604, 610, and 612 have a Pcapmin of 100 Watts and a Pcapmax of 600 Watts. Further, server 602 has a priority of 1 with a demand of 300 Watts, server 604 has a priority of 0 with a demand of 600 Watts, server 610 has a priority of 1 with a demand of 600 Watts, and server 612 has a priority of 0 with a demand of 300 Watts. Overcurrent protection devices 606A, 606B, 614A, and 614B have an associated limit of 900 Watts and RPPs 608A and 608B have an associated limit of 1100 Watts.

At this point is should be noted that, in this example, power supplies 605A of server 604 and power supply 611B of server 610 have failed. Thus, utilizing determinations similar to that illustrated in FIG. 3-5, power capping mechanism 640 initially determines a power budget for overcurrent protection device 606A of 300 Watts, a power budget for overcurrent protection device 614A of 800 Watts, a power budget for overcurrent protection device 606B of 833 Watts, and a power budget for overcurrent protection device 614B of 267 Watts. Furthermore, power capping mechanism 640 initially determines a power budget for power supply 603A of 300 Watts, a power budget for power supply 611A of 600 Watts, a power budget for power supply 613A of 200 Watts, a power budget for power supply 603B of 300 Watts, a power budget for power supply 605B of 533 Watts, and a power budget for power supply 61BA of 267 Watts. As is illustrated, the initial power budget for server 602 is balanced between power supplies 603A and 603B since both have a power budget allocation of 300 Watts. However, the initial power budget for server 612 is unbalanced since the power budget for power supply 613A is 200 Watts, which is the maximum that server 612 can now operate, and the power budget for power supply 613B is 267 Watts, which leaves 67 Watts stranded or unusable.

Figure 6B:
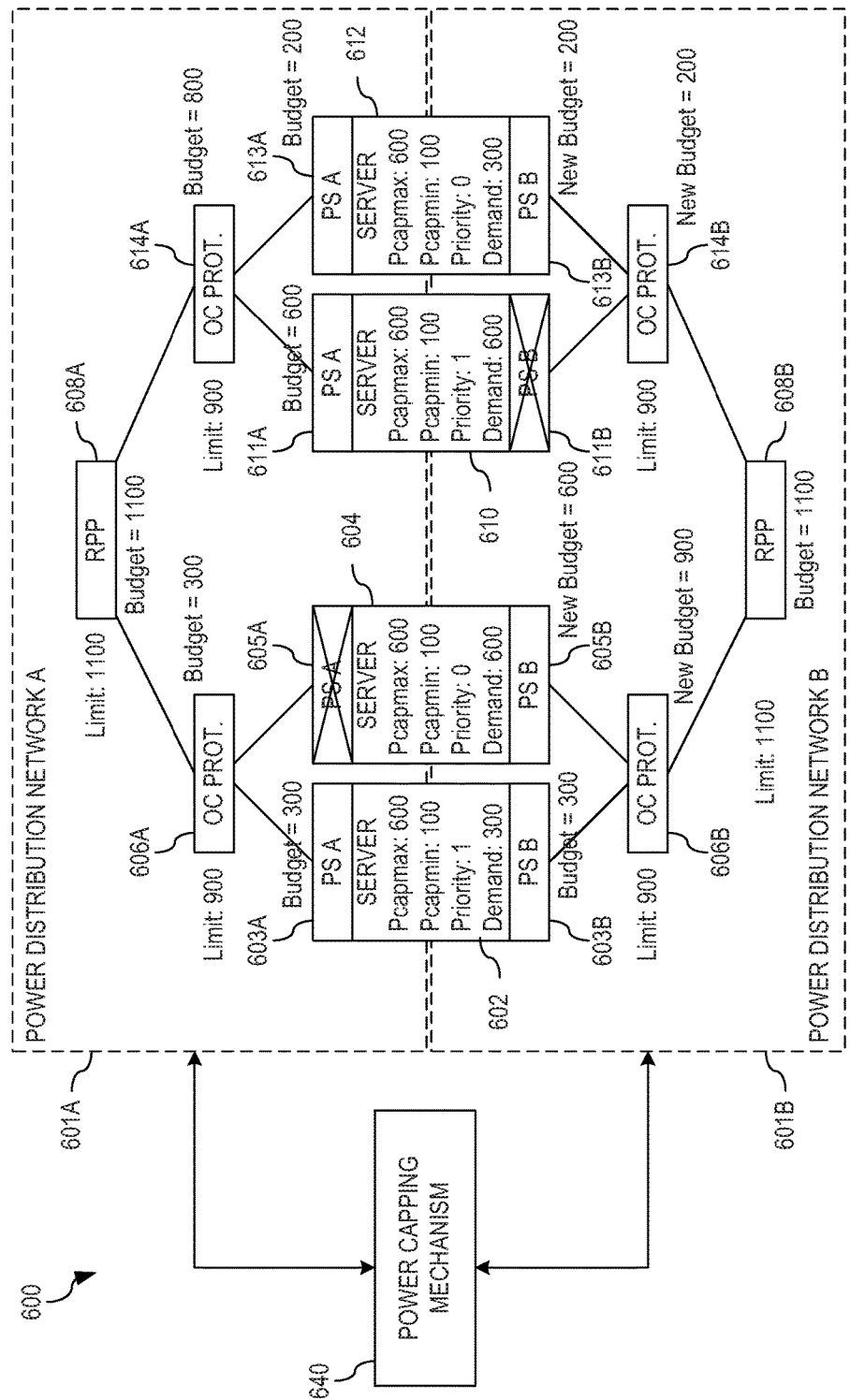

Thus, prior to applying the power budget identified in the first power budget determination, in accordance with the illustrative embodiments, power capping mechanism 640 initializes a secondary power budget determination to utilize any stranded power, such as that stranded at power supply 613B, which is shown in FIG. 6B. In FIG. 6B, power capping mechanism 640 determines which of the sets of power supplies 603A and 603B, 605A and 605B, 611A and 611B, and/or 613A and 613B have stranded power. Power capping mechanism 640 determines whether there is stranded power by comparing the initial power budgets assigned to each set of power supplies, ignoring any set of power supplies where only one power supply has an assigned power budget. Thus, for the set of power supplies 603A and 603B, power capping mechanism 640 determines that there is no stranded power since the difference between 300 Watts and 300 Watts is 0 Watts. For the set of power supplies 605A and 605B, power capping mechanism 640 determines that there is no stranded power since power supply 605A is in a failed state. For the set of power supplies 611A and 611B, power capping mechanism 640 determines that there is no stranded power since power supply 611B is in a failed state. However, for the set of power supplies 613A and 613B, power capping mechanism 640 determines that there is stranded power since the difference between 200 Watts and 267 Watts is 67 Watts.

In the event of a power supply having stranded power, power capping mechanism 640 adjusts the requested demand for the power supply that has stranded power, i.e. power supply 613B in this example, to match the budgeted power of the matching power supply, i.e. power supply 613A. Thus, power capping mechanism 640 adjusts the power budget for power supply 613B to 200 Watts. With an excess of power identified, i.e. the 67 Watts, power capping mechanism 640 determines if any other power budget in under the requested demand. In this example, power supply 603B was assigned all of its requested demand of 300 Watts since its priority is 1. However, power supply 605B was only assigned a portion of its requested demand since its priority is 0. With the identified excess of power, i.e. the 67 watts, power capping mechanism 640 shifts the budgeted power to meet as much of the requested demand as possible. In this example, power supply 605B requested 600 watts but was initially assigned only 533 Watts. power capping mechanism 640 then reassigns the excess 67 Watts to power supply 605B making its new budgeted power 600 Watts.

Once all of the power budgets have been analyzed to account for any stranded power, power capping mechanism 640 allocates the secondary power budgets determinations to the power supplies of the servers and, upon receiving the allocated power budgets, the power supplies and the servers operate at the allocated power budget. While the example above illustrates servers with two power supplies, the mechanism of the illustrative embodiments are not limited to computing resource with only two power supplies. That is, since stranded power is identified as an initially budgeted power budget of any power supply in excess of a power budget of an associated of power supply, where the limiting factor is a limiting power budget which may be the lowest power budget, then the illustrative embodiments may be extended to any computing resource that has multiple power supplies.

Thus, the illustrative embodiments are intended to operate on a periodic interval so that the mechanisms are responsive to power load changes on the servers, priority changes of the servers, and loss of available power supply in the network from contractual changes or equipment failure. The illustrative embodiments may also be recomputed upon changes to the inputs (priority, demand power, or the like).

It is understood that power supplying devices are typically designed to be operated safely in overload conditions by design for short time intervals. The periodic time interval of the illustrative embodiments is intended to be much smaller than the time for the overcurrent protection devices to trip, or the time period at which power supplying devices may operate in an overload condition. Therefore, the illustrative embodiments will safely operate the data center even in the event of quick power consumption ramp rates. It is further understood that lower levels of the hierarchy may compute at different (e.g. faster) time intervals than the higher levels. In this way, the lower level may be immediately responsive to power load changes and priority changes while operating within a budget provided from a higher level.

Figure 7:
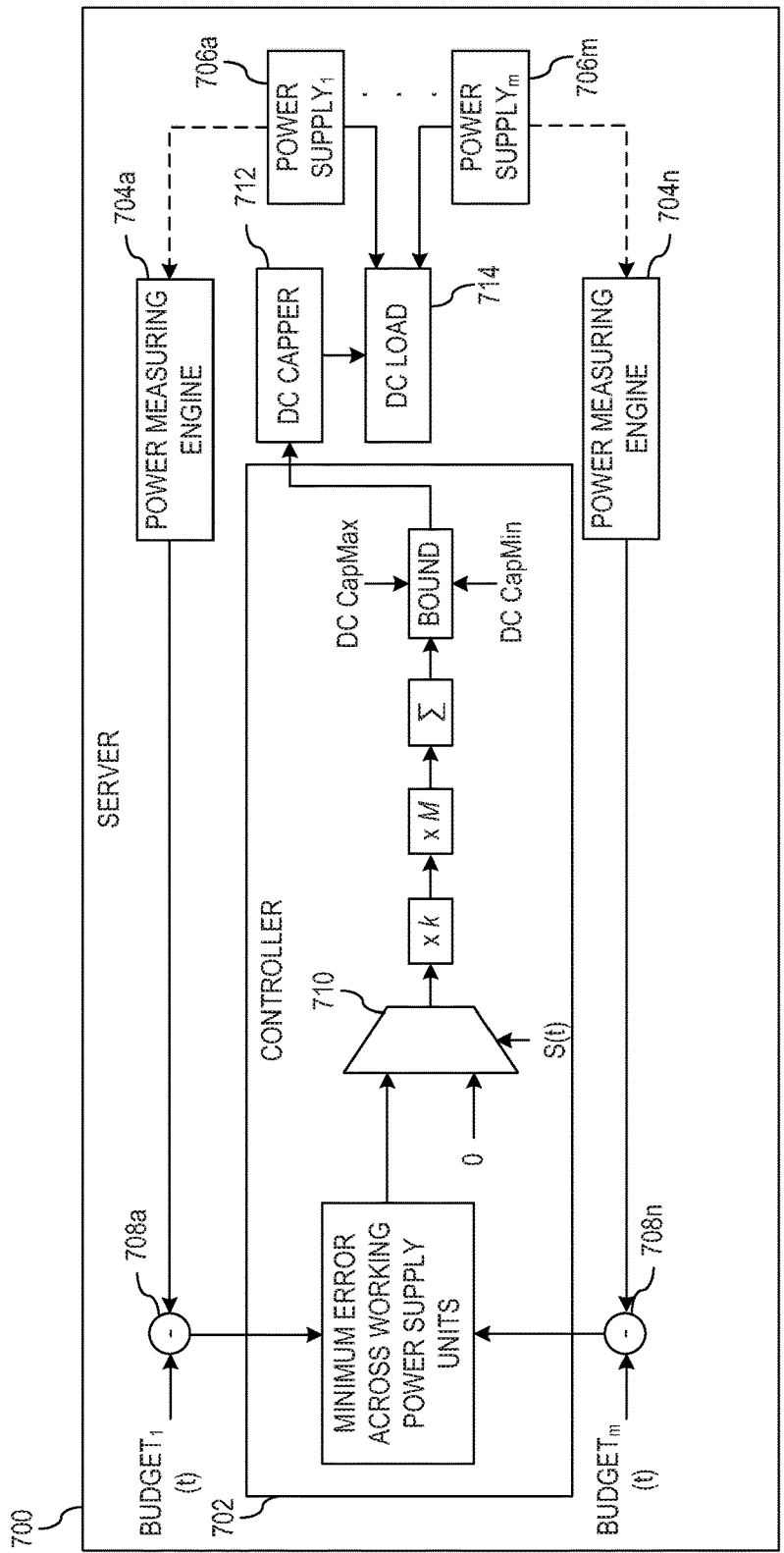
FIG. 7 depicts one exemplary controlling mechanism for controlling DC power via a single DC Capper to multiple subcomponents within a server supplied with power from multiple power supplies in accordance with an illustrative embodiment.

With the power supplies of each server receiving is allocated power budget, mechanisms within the server must then convert the power budget (received in Alternating Current (AC) Watts) to a Direct Current (DC) power budget or convert an external high DC voltage to an internal lower DC voltage that is also based on the power supply efficiency and divide the received power budgets amongst the subcomponents, i.e. blades, sleds, or the like, of the server. FIG. 7 depicts one exemplary controlling mechanism for controlling DC power via a single DC Capper to multiple subcomponents within a server supplied with power from multiple power supplies in accordance with an illustrative embodiment. Controller 702 within server 700 comprises power measuring engines 704a-704n that measure, at each control interval t, input power from their associated power supplies 706a-706m. Error determination engines 708a-708n then compute an error values by determining a difference between the associated budgeted power received from the power capping mechanism, such as power capping mechanism 640 of FIGS. 6A and 6B, and the input power measured by the respective power measuring engines 704a-704n. Controller 702 then selects a minimum power error value from the error values determined by error determination engines 708a-708n. In accordance with the illustrative embodiments, the minimum power error value is the less of the power error values. That is, the power error values may be positive or negative and controller 702 selects the least of the power error values as the minimum power error value.

The controller 702 then determines whether the power is within a controllable operating region by determining whether either a DC cap at time T−1 (DC Cap(t−1)) is greater than or equal to a DC cap maximum (DC Cap Max) OR a Throttle at time t−1 (Throttle (t−1)) is equal to zero percent (0%) AND the selected minimum power error value at time t (error (t)) is greater than 0, which may be written as:

(DC Cap(*t*−1)≥DC Cap Max OR Throttle(*t*−1)=0% AND error(*t*)>0 or DC cap at time T−1 (DC Cap(t−1)) is less than or equal to a DC cap minimum (DC Cap Min) OR a Throttle at time t−1 (Throttle (t−1)) is equal to 100 percent (100%) AND the selected minimum power error value at time t (error (t)) is less than 0, which may be written as:

(DC Cap(*t*−1)≤DC Cap Min OR Throttle(*t*−1)=100% AND error(*t*)<0.

If either of these conditions are true, controller 702 causes a selection at interval t S(t) of multiplexor 710 to select a first input, which is an input of a zero (0). If neither of these conditions are true then controller 702 causes a selection at time t S(t) of multiplexor 710 to select a second input, which is an input of the selected minimum power error value at time t (error (t)). The following are operations that occur when the second input is selected. That is, the same operations may be performed when the first input of a zero is selected; however, the operations would result in not changes and DC capper 712 would throttle the DC load 714 at a previous setting. Utilizing the second input results, as is showing in the following, the DC cap changes.

With the second input selected, if the selected minimum power error value at time t (error (t)) is in a high DC voltage, controller 702 utilizes a DC to DC conversion factor based on the power supply efficiency that converts the external high DC voltage to an internal lower DC voltage. Alternatively, with the second input selected, if the selected minimum power error value at time t (error (t)) is in AC watts, which is not usable by the DC capper 712 to throttle DC load 714. Thus, controller 702 converts the selected minimum power error value at time t (error (t)) in AC Watts to an internal minimum power error value in DC watts. Controller 702 does this by multiplying the selected minimum power error value at time t (error (t)) by a factor k that is used to translate external power to internal power. The factor k may be determined utilizing any number of methods, for example:

Method 1: offline approach. Using power supply specifications and taking a static average value for k for the operating range of the server. For real power supplies, the range of k is small and the control loop is expected to settle even if the selected k deviates from true efficiency. k could also be adjusted periodically based on load, following power supply specifications.

Method 2: Periodically set k to the measured power supply efficiency to closely track real efficiency. This is close enough to the ratio of the change in internal Watts to external Watts due to the actuation of the control interval that we expect the controller to settle.

Method 3: (ideal) k translates the difference in external Watts to a difference in internal Watts at the current load point of the power supply. k can be determined by characterizing the PSU across many load points by changing the sled power and measuring the change in external power and building a table. For a particular PSU load, the table provides k=delta_internal/delta_external (from characterization measurements).

With the internal minimum power error value determined, controller 702 multiplies the internal minimum power error value by the number of working power supply units (M) of the server resulting in an internal minimum power error value for the multiple power supply units 706a-706m. Controller 702 then sums the internal minimum power error value for the multiple power supply units 706a-706m with a present DC power cap value that indicates how much DC load 714 should be throttled by DC capper 712. The summed DC power cap value is bounded by a both a DC power cap maximum (DC Cap Max) and a DC power cap minimum (DC Cap Min) such that, if the summed DC power cap value is above DC Cap Max, the DC Cap Max value is used or, if the summed DC power cap value is below DC Cap Min, the DC Cap Min value is used. Using the DC Cap Max and DC Cap Min ensures that DC load 714 is not throttled or over powered excessively. Therefore, after controller 702 determines the summed DC power cap value, controller 702 provides the summed DC power cap value, the DC Cap Max value, or the DC Cap Min value to DC Capper 712 for throttling of DC load 714. The type of throttling implemented by DC capper 712 may be, for example, processor clock frequency and voltage scaling, processor clock throttling, idle cycle injection, or the like.

Figure 8:
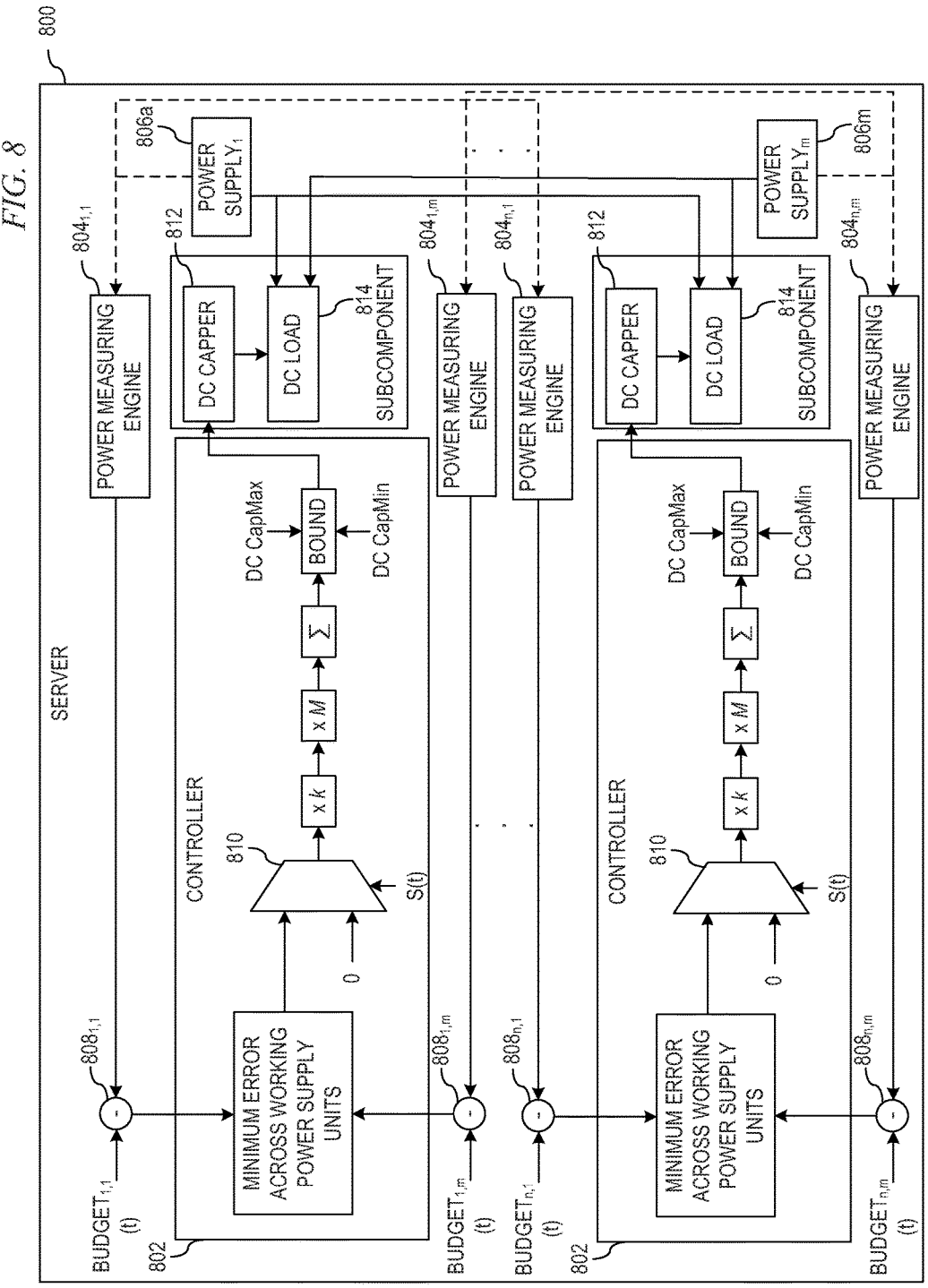
FIG. 8 depicts one exemplary controlling mechanism for controlling DC power via individual DC Cappers each associated with a respective subcomponent within a server supplied with power from multiple power supplies in accordance with an illustrative embodiment.

FIG. 8 depicts one exemplary controlling mechanism for controlling DC power via individual DC Cappers each associated with a respective subcomponent within a server supplied with power from multiple power supplies in accordance with an illustrative embodiment. In FIG. 8, controller 802 in each subcomponent within server 800 comprises power estimating engines $804_{i,1}$-$804_{i,m}$ that estimate, at each control interval t, input power from power supplies 806a-806n. In this embodiment, for each subcomponent 816a-816n, power estimating engines $804_{i,1}$-$804_{i,m}$ estimates, for each subcomponent i, where i goes from 1 to n, and for each power supply j, where j goes from 1 to m, an estimated input power using the following:

$$\text{Estimate}_{i,j} = \text{PowerSupply\_Power\_In}_j \times \frac{SCMeasure_i}{\sum_{i=1...n} SCMeasure_i},$$

where PowerSupply_Power_In$_j$ is input power from associated power supplies 806a-806n, SCMeasure$_i$ is a power consumption value provided by the respective subcomponent, and ΣSCMeasure$_i$ from 1 to n is the sum of the power consumption values provided by all of the subcomponents. Using the estimated input power for the respective subcomponent i and power supplies j, associated error determination engines $808_{i,1}$-$808_{i,m}$ then compute an error value by determining a difference between the associated budgeted power received from the power capping mechanism, such as power capping mechanism 640 of FIGS. 6A and 6B, and the estimated input power measured by power estimating measuring engines $804_{i,1}$-$804_{i,m}$.

For each subcomponent, the remaining operations then follow the operation described above, where controller 802 selects a minimum power error value from the error values determined by error determination engines $808_{i,1}$-$808_{1,m}$. In accordance with the illustrative embodiments, the minimum power error value is the less of the power error values. That is, the power error values may be positive or negative and controller 802 selects the least of the power error values as the minimum power error value.

The controller 802 then determines whether the power is within a controllable operating region by determining whether either a DC cap at time T−1 (DC Cap(t−1)) is greater than or equal to a DC cap maximum (DC Cap Max) OR a Throttle at time t−1 (Throttle (t−1)) is equal to zero percent (0%) AND the selected minimum power error value at time t (error (t)) is greater than 0, which may be written as:

(DC Cap(t−1)≥DC Cap Max OR Throttle(t−1)=0%
AND error(t)>0 or DC cap at time T−1 (DC Cap(t−1)) is less than or equal to a DC cap minimum (DC Cap Min) OR a Throttle at time t−1 (Throttle (t−1)) is equal to 100 percent (100%) AND the selected minimum power error value at time t (error (t)) is less than 0, which may be written as:

(DC Cap(t−1)≤DC Cap Min OR Throttle(t−1)=100%
AND error(t)<0.

If either of these conditions are true, controller 802 causes a selection at time t S(t) of multiplexor 810 to select a first input, which is an input of a zero (0). If neither of these conditions are true then controller 802 causes a selection at time t S(t) of multiplexor 810 to select a second input, which is an input of the selected minimum power error value at time t (error (t)). The following are operations that occur when the second input is selected. That is, the same operations may be performed when the first input of a zero is selected; however, the operations would result in not changes, where utilizing the second input results in the following DC cap changes.

With the second input selected, the selected minimum power error value at interval t (error (t)) is still in AC watts, which is not usable by the DC capper 812 to throttle DC load 814. Thus, controller 802 converts the selected minimum power error value at time t (error (t)) in AC Watts to an internal minimum power error value in DC watts. Controller does this by multiplying the selected minimum power error value at time t (error (t)) by a factor k that is used to translate external power to internal power. The factor k may be determined utilizing any number of methods, for example:

Method 1: offline approach. Using power supply specifications and taking a static average value for k for the operating range of the server. For real power supplies, the range of k is small and the control loop is expected to settle even if the selected k deviates from true efficiency. k could also be adjusted periodically based on load, following power supply specifications.

Method 2: Periodically set k to the measured power supply efficiency to closely track real efficiency. This is close enough to the ratio of the change in internal Watts to external Watts due to the actuation of the control interval that we expect the controller to settle.

Method 3: (ideal) k translates the difference in external Watts to a difference in internal Watts at the current load point of the power supply. k can be determined by characterizing the PSU across many load points by changing the sled power and measuring the change in external power and building a table. For a particular PSU load, the table provides k=delta_internal/delta_external (from characterization measurements).

With the internal minimum power error value determined, controller 802 multiplies the internal minimum power error value by the number of working power supply units (M) of the server resulting in an internal minimum power error value for the multiple power supply units 806a-806n. Controller 802 then sums the internal minimum power error value for the multiple power supply units 806a-806n with a present DC power cap value that indicates how much the DC load 814 should be throttled by DC capper 812. The summed DC power cap value is bounded by a both a DC power cap maximum (DC Cap Max) and a DC power cap minimum (DC Cap Min) such that, if the summed DC power cap value is above DC Cap Max, the DC Cap Max value is used or, if the summed DC power cap value is below DC Cap Min, the DC Cap Min value is used. Using the DC Cap Max and DC Cap Min ensures that the DC load 814 is not throttled or over powered excessively. Therefore, after controller 802 determines the summed DC power cap value, controller 802 provides the summed DC power cap value, the DC Cap Max value, or the DC Cap Min value to DC Capper 812 for throttling of DC load 814. The type of throttling implemented by DC capper 812 may be, for example, processor clock frequency and voltage scaling, processor clock throttling, idle cycle injection, or the like.

Thus, the controller 702 of FIG. 7 and controller 802 of FIG. 8 in their respective embodiments take the allocated power budgets from each of the multiple power supplies and, when the power consumption device being fed by the multiple power supplies has multiple subcomponents divides the allocated power budgets among the subcomponents. Using the provided power budgets or power caps as inputs and determines appropriate power caps to apply to each subcomponent in the power consumption device results in each power supply running at or lower than their associated power budget.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
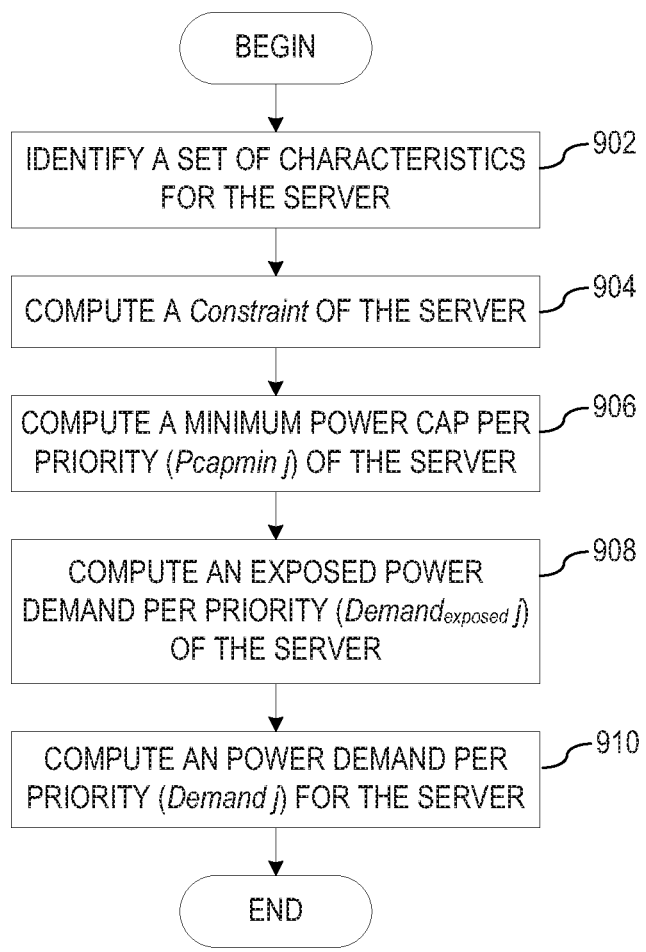
FIG. 9 depicts a flow diagram of the operation performed by a priority-aware power capping mechanism in determining a set of metrics for a server, i.e. a power consumption device, in a data center in accordance with an illustrative embodiment.

FIG. 9 depicts a flow diagram of the operation performed by a priority-aware power capping mechanism in determining a set of metrics for a server, i.e. a power consumption device, in a data center in accordance with an illustrative embodiment. As the operation begins, the priority-aware power capping mechanism identifies a set of characteristics for the server (step 902) including a Demand that refers to the power that the server currently desires to consume without enforcing any power caps, a Pcapmin that refers to the lowest power cap that the server can operate under, a Pcapmax that refers to the largest possible power cap that the server can operate under, and a priority j that is the instant priority of the server. The priority-aware power capping mechanism then computes a Constraint of the server (step 904) that is a maximum amount of power that is allowed to flow through server using the following formula:

$$\text{Constraint} = P\text{capmax}.$$

The priority-aware power capping mechanism then computes a minimum power cap per priority (Pcapmin j) of the server (step 906) that is minimum power budget that the server requires to receive for the assigned priority using the following formula:

$$P\text{capmin } j = P\text{capmin}.$$

The priority-aware power capping mechanism then computes an exposed power demand per priority ($\text{Demand}_{exposed}$ j) of the server (step 908) that is the power demand that the server exposes to its parent power controller for the assigned priority using the following formula:

$$Demand_{exposed}\, j = \max\{Demand, Pcapmin\}.$$

The priority-aware power capping mechanism then computes a power demand per priority (Demand j) for the server (step 910) that is the power demand that the server desires to utilize using the following formula:

$$Demand\, j = \max\{Demand, Pcapmin\}.$$

The operation ends thereafter.

Figure 10:
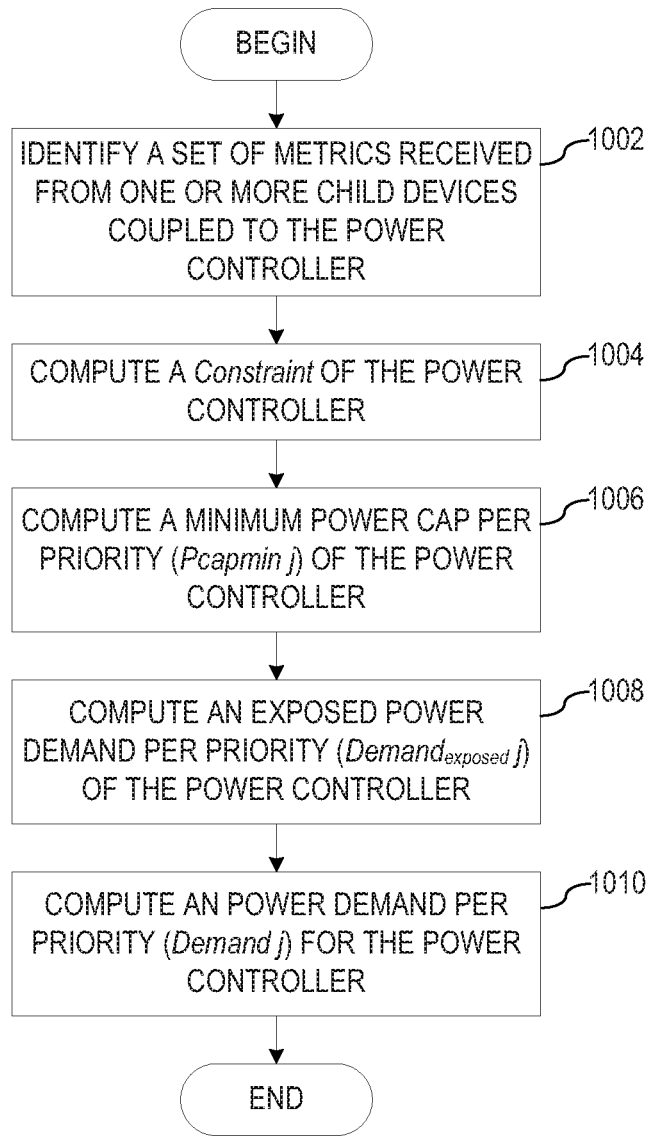
FIG. 10 depicts a flow diagram of the operation performed by a priority-aware power capping mechanism in determining a set of metrics for a power controller, i.e. a power distribution device, in a data center in accordance with an illustrative embodiment.

FIG. 10 depicts a flow diagram of the operation performed by a priority-aware power capping mechanism in determining a set of metrics for a power controller, i.e. a power distribution device, in a data center in accordance with an illustrative embodiment. As the operation begins, the priority-aware power capping mechanism identifies a set of metrics received from one or more child devices coupled to the power controller (step 1002). Using this set of metrics, the priority-aware power capping mechanism computes a Constraint of the power controller (step 1004) that is a maximum amount of power that is allowed to flow through power controller using the following formula:

$$Constraint = \min\left\{Limit, \sum_i Constraint\, ij\right\}.$$

The priority-aware power capping mechanism then computes a minimum power cap per priority (Pcapmin j) of the power controller (step 1006) that is minimum power budget that the power controller requires to receive for the assigned priority using the following formula:

$$Pcapmin\, j = \sum_i Pcapmin\, ij.$$

The priority-aware power capping mechanism then computes an exposed power demand per priority (Demand$_{exposed}$ j) of the power controller (step 1008) that is the power demand that the power controller exposes to its parent power controller for the assigned priority using the following formula:

$$Demand_{exposed}\, j =$$
$$\min\left\{limit - \sum_{k<j} Pcapmin\, k - \sum_{k>j} Demand_{exposed}\, k, \sum_i Demand_{exposed}\, ij\right\}.$$

The priority-aware power capping mechanism then computes a power demand per priority (Demand j) for the power controller (step 1010) that is the power demand that the power controller desires to utilize using the following formula:

$$Demand\, j = \sum_i Demand\, ij.$$

Throughout the operations of FIG. 10, i is each child power controller/server below the power controller, j is the instant priority being considered, and k is all other priorities other than priority j being considered. The operation ends thereafter.

Figure 11:
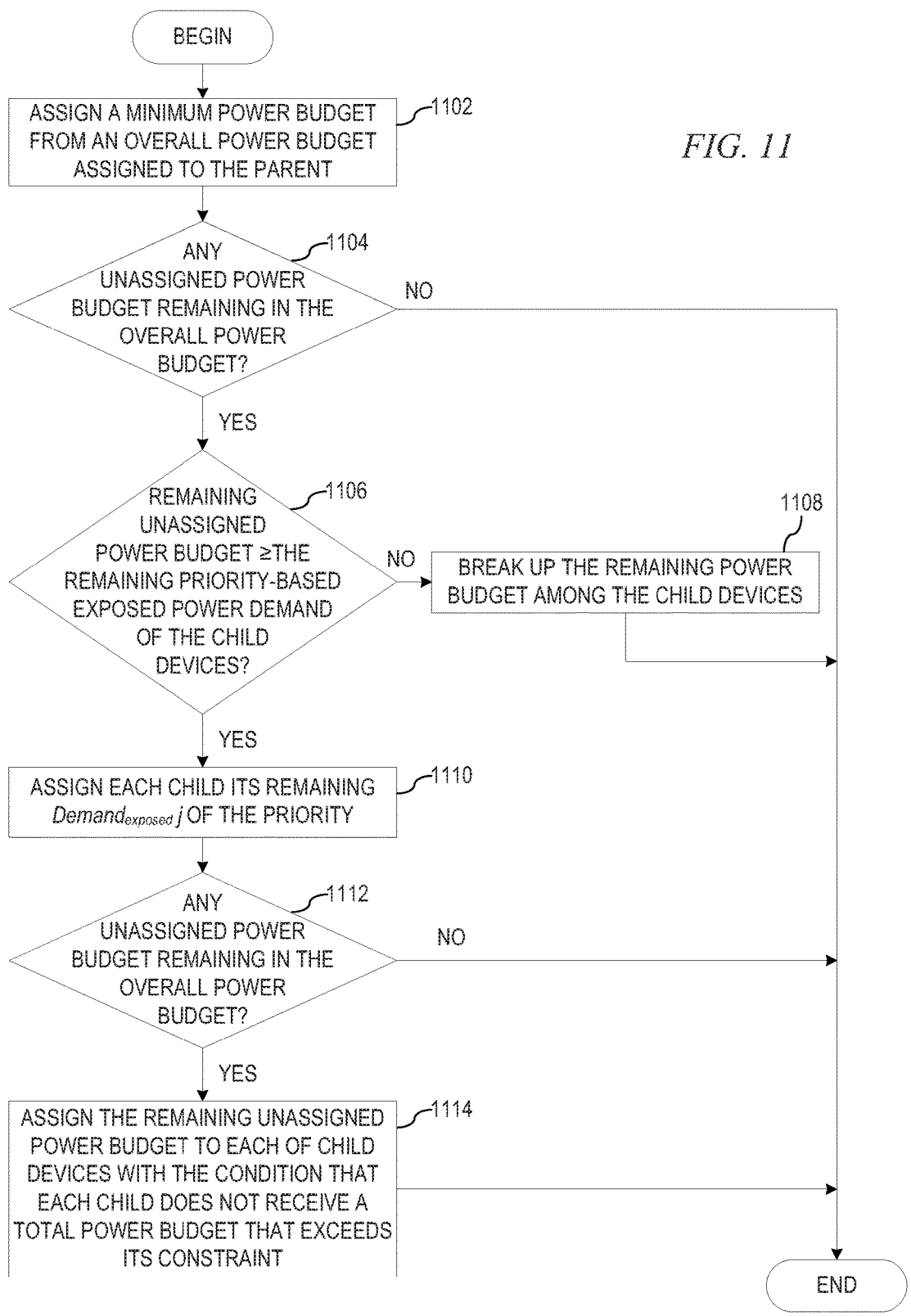
FIG. 11 depicts a flow diagram of the operation performed by a priority-aware power capping mechanism in assigning power budgets to each power controller and eventually to each power consumption device for use as a throttling value when certain conditions are met based on a determined power budget in accordance with an illustrative embodiment.

FIG. 11 depicts a flow diagram of the operation performed by a priority-aware power capping mechanism in assigning power budgets to each power controller and eventually to each power consumption device for use as a throttling value when certain conditions are met based on a determined power budget in accordance with an illustrative embodiment. As the operation begins, for each child device in a set of child device of a parent working from highest to lowest priority, the priority-aware power capping mechanism assigns a minimum power budget, from an overall power budget assigned to the parent, by assigning the determined priority Pcapmin j to each child based on the child's priority (step 1102). The priority-aware power capping mechanism determines whether there is any unassigned power budget remaining in the overall power budget (step 1104). If at step 1104 there is no unassigned power budget remaining in the overall power budget, the operation ends. If at step 1104 there is unassigned power budget remaining in the overall power budget, the priority-aware power capping mechanism determines whether the remaining unassigned power budget is greater than or equal to the remaining priority-based exposed power demand value of the child devices (step 1106).

If at step 1106 the remaining unassigned power budget is less than the remaining priority-based exposed power demand value of the child devices, the priority-aware power capping mechanism utilizes a supplemental algorithm to break up the remaining power budget among the child devices (step 1108), with the condition that each priority of each child does not receive a total power budget that exceeds its Demand$_{exposed}$ j of the priority. The supplemental algorithm may be, for example, an equal proportion algorithm, a high-demand cut-first algorithm, or the like. The operation ends thereafter. If at step 1106 the remaining unassigned power budget is greater than or equal to the remaining priority-based exposed power demand value, the priority-aware power capping mechanism assigns each child its remaining Demand$_{exposed}$ j of the priority (step 1110).

The priority-aware power capping mechanism then determines whether there is any unassigned power budget remaining in the overall power budget (step 1112). If at step 1112 there is no unassigned power budget remaining in the overall power budget, the operation ends. If at step 1112 there is unassigned power budget remaining in the overall power budget, the priority-aware power capping mechanism assigns the remaining unassigned power budget to each of child devices (step 1114) with the condition that each child does not receive a total power budget that exceeds its constraint using a supplemental algorithm, such as for example, an equal proportion algorithm, a high-demand cut-first algorithm, or the like. The operation ends thereafter.

Figure 12:
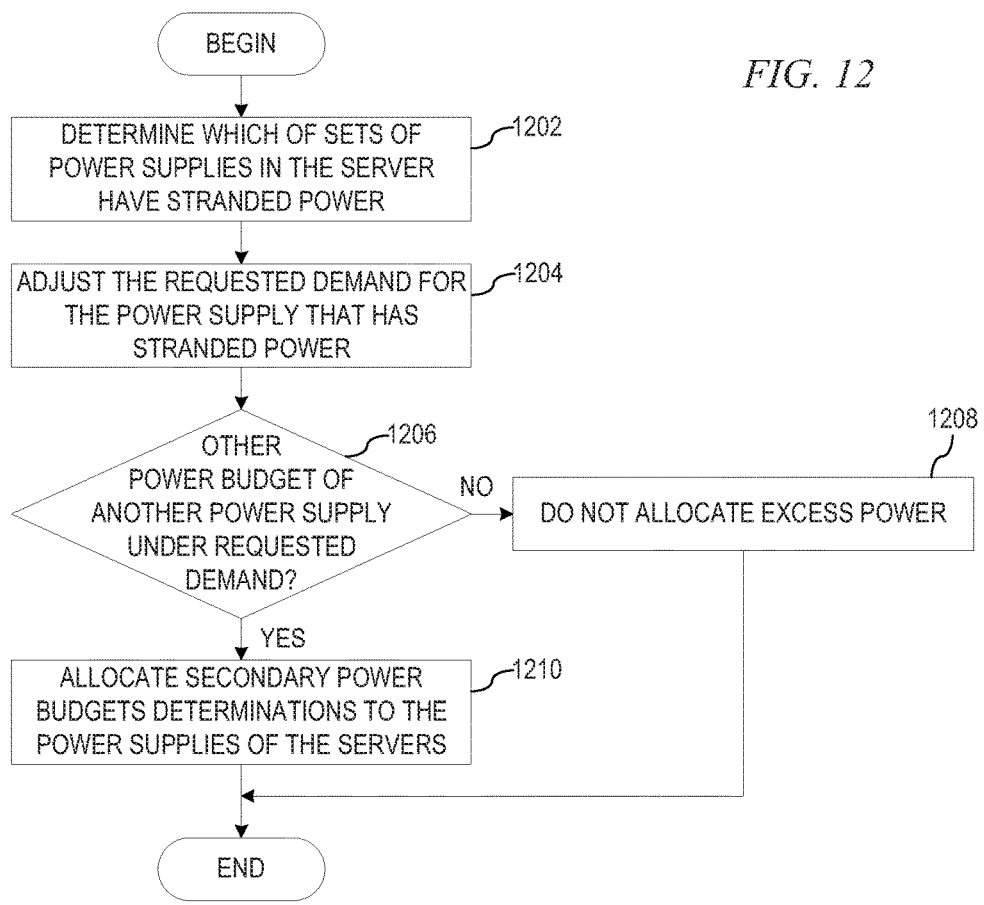
FIG. 12 depicts a flow diagram of the operation performed by a power capping mechanism in identifying any stranded power and reallocating the stranded power to one or more other power consumption devices in accordance with an illustrative embodiment.

FIG. 12 depicts a flow diagram of the operation performed by a priority-aware power capping mechanism in identifying any stranded power and reallocating the stranded power to one or more other power consumption devices in accordance with an illustrative embodiment. As the operation begins, the priority-aware power capping mechanism determines which of sets of power supplies in the server have stranded power (step 1202). The priority-aware power capping mechanism determines whether there is stranded power by comparing the initial power budgets assigned to each set of power supplies, ignoring any set of power supplies where only one power supply has an assigned power budget. For each power supply having stranded power, the priority-aware power capping mechanism adjusts the requested demand for the power supply that has stranded power to match a budgeted power of an associated power supply (step 1204). Utilizing the identified excess of power identified, i.e. the stranded power, the priority-aware power capping mechanism determines whether any other power budget of another power supply is under a requested demand (step 1206). If at step 1206 a power budget of one or more other power supplies fails to be under a requested demand, the excess power remains unallocated (step 1208), with the operation terminating thereafter. If at step 1206 a power budget of one or more other power supplies is under their requested demand, the priority-aware power capping mechanism allocates the secondary power budgets determinations to the power supplies of the servers (step 1210). The excess power budget is divided among two or more power supplies of the servers with the condition that each child does not receive a total power budget that exceeds its constraint using a supplemental algorithm, such as for example, an equal proportion algorithm, a high-demand cut-first algorithm, or the like. The operation ends thereafter.

Figure 13:
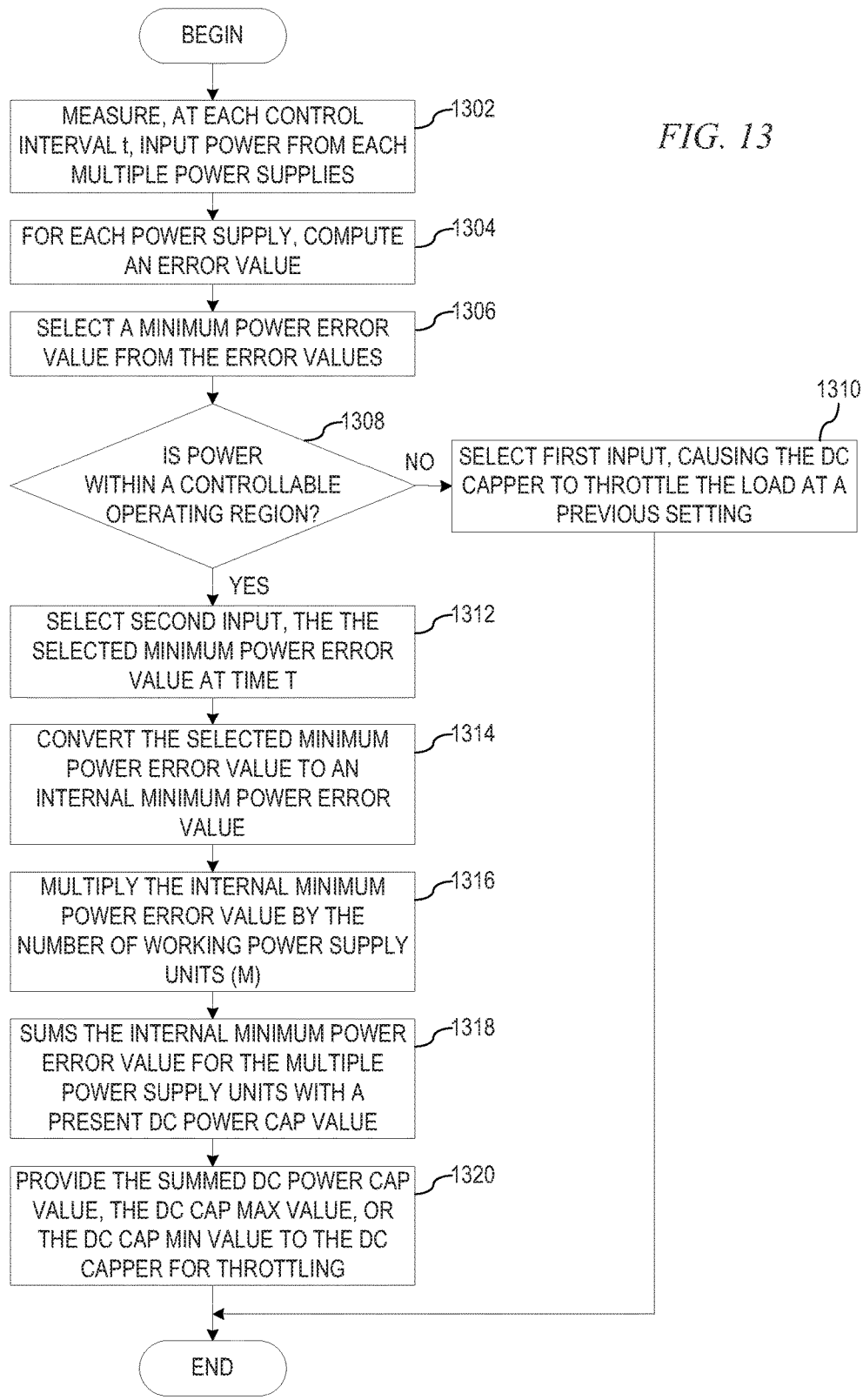
FIG. 13 depicts a flow diagram of the operation performed by a controller in enforcing power caps to subcomponents of a server with multiple power supplies in accordance with an illustrative embodiment.

FIG. 13 depicts a flow diagram of the operation performed by a controller in enforcing power caps to subcomponents of a server with multiple power supplies in accordance with an illustrative embodiment. As the operation begins, the controller measures, at each control interval t, input power from each multiple power supplies feeding the server (step 1302). For each power supply, the controller computes an error value by determining a difference between the associated budgeted power received from a power capping mechanism and the measured input power measured for the power supply (step 1304). The controller then selects a minimum power error value from the error values (step 1306). In accordance with the illustrative embodiments, the minimum power error value is the less of the power error values. That is, the power error values may be positive or negative and the controller selects the least of the power error values as the minimum power error value.

The controller then determines whether the power is within a controllable operating region (step 1308) by determining whether either a DC cap at time T−1 (DC Cap(t−1)) is greater than or equal to a DC cap maximum (DC Cap Max) OR a Throttle at time t−1 (Throttle (t−1)) is equal to zero percent (0%) AND the selected minimum power error value at time t (error (t)) is greater than 0, which may be written as:

(DC Cap(*t*−1)≥DC Cap Max OR Throttle(*t*−1)=0%
AND error(*t*)>0 or DC cap at time T−1 (DC Cap(t−1)) is less than or equal to a DC cap minimum (DC Cap Min) OR a Throttle at time t−1 (Throttle (t−1)) is equal to 100 percent (100%) AND the selected minimum power error value at time t (error (t)) is less than 0, which may be written as:

(DC Cap(*t*−1)≤DC Cap Min OR Throttle(*t*−1)=100%
AND error(*t*)<0.

If at step 1308 either of these conditions is true, the controller causes a selection at interval t S(t) of a multiplexor to select a first input, which is an input of a zero (0), which causes the DC capper to throttle the load at a previous setting (step 1310), with the operation ending thereafter. If at step 1308 neither of the conditions are true, the controller causes a selection at time t S(t) of the multiplexor to select a second input (step 1312), which is an input of the selected minimum power error value at time t (error (t)) of step 1306. With the second input selected, the selected minimum power error value at time t (error (t)) is still in AC watts, which is not usable by a DC capper to throttle a DC load. Thus, the controller converts the selected minimum power error value at time t (error (t)) in AC Watts to an internal minimum power error value in DC watts by first multiplying the selected minimum power error value at time t (error (t)) by a factor k that is used to translate external power to internal power (step 1314).

With the internal minimum power error value determined, the controller multiplies the internal minimum power error value by the number of working power supply units (M) of the server (step 1316) resulting in an internal minimum power error value for the multiple power supply units. The controller then sums the internal minimum power error value for the multiple power supply units with a present DC power cap value that indicates how much the DC load should be throttled by the DC capper (step 1318). The summed DC power cap value is bounded by a both a DC power cap maximum (DC Cap Max) and a DC power cap minimum (DC Cap Min) such that, if the summed DC power cap value is above DC Cap Max, the DC Cap Max value is used or, if the summed DC power cap value is below DC Cap Min, the DC Cap Min value is used. Using the DC Cap Max and DC Cap Min ensures that the DC load is not throttled or over powered excessively. Therefore, after the controller determines the summed DC power cap value, the controller provides the summed DC power cap value, the DC Cap Max value, or the DC Cap Min value to the DC Capper for throttling of the DC load (step 1320). The type of throttling implemented by the DC capper may be, for example, processor clock frequency and voltage scaling, processor clock throttling, idle cycle injection, or the like. The operation ends thereafter.

Figure 14:
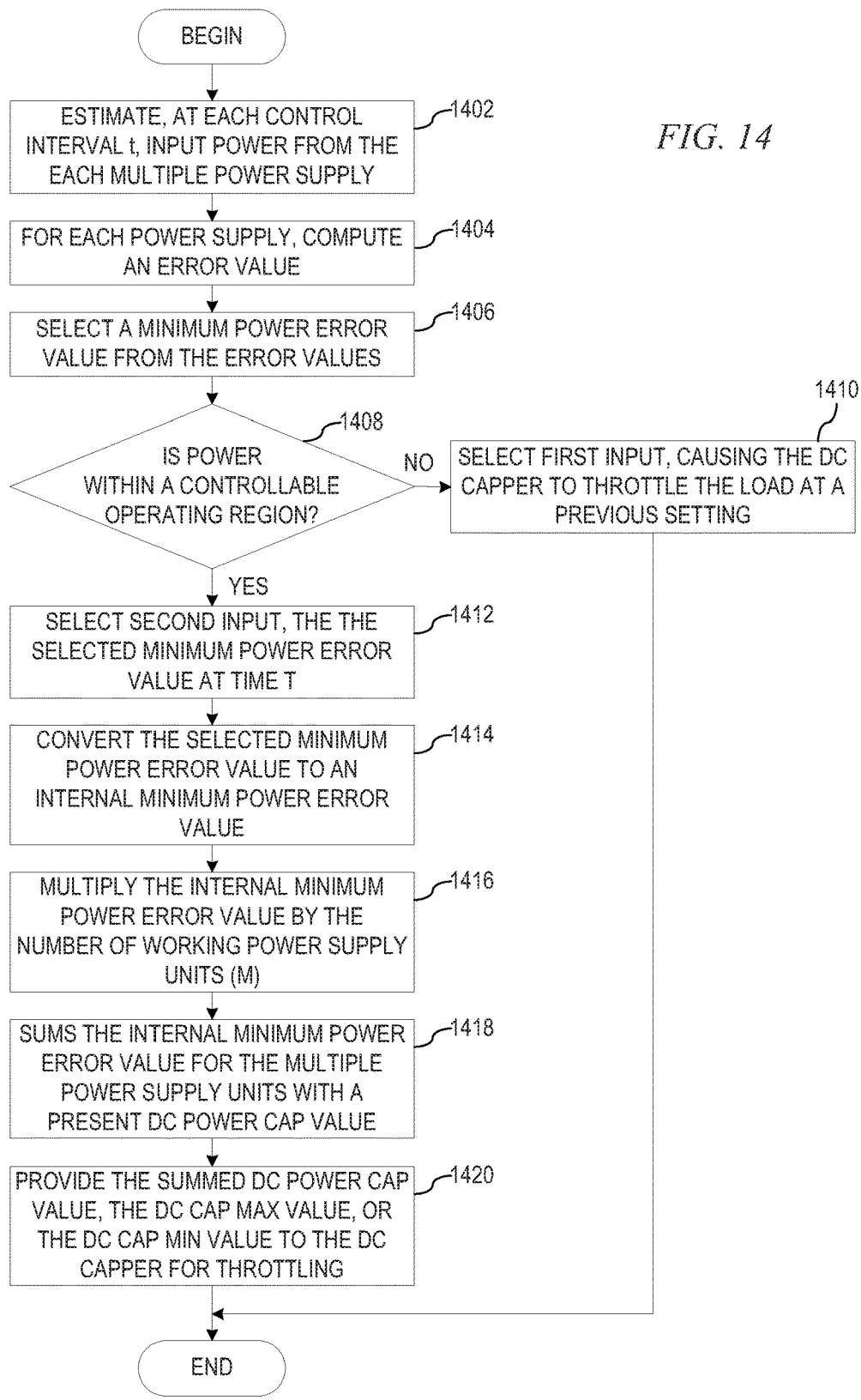
FIG. 14 depicts a flow diagram of the operation performed by a controller in enforcing power caps to individual DC Cappers each associated with a respective subcomponent within a server supplied with power from multiple power supplies with multiple power supplies in accordance with an illustrative embodiment.

FIG. 14 depicts a flow diagram of the operation performed by a controller in enforcing power caps to individual DC Cappers each associated with a respective subcomponent within a server supplied with power from multiple power supplies with multiple power supplies in accordance with an illustrative embodiment. As the operation begins, the controller estimates, at each control interval t, input power from each multiple power supply (step 1402) feeding the server using the following:

$$\text{Estimate}_{i,j} = \text{PowerSupply\_Power\_In}_j \times \frac{SCMeasure_i}{\sum SCMeasure_{1-n}},$$

where $\text{PowerSupply\_Power\_In}_j$ is input power from the associated power supply j, $SCMeasure_i$ is a power consumption value provided by the respective subcomponent, and $SCMeasure_{1-n}$ is the sum of the power consumption values provided by all of the subcomponents.

For each power supply, the controller computes an error value by determining a difference between the associated budgeted power received from the power capping mechanism and the estimated input power measured (step 1404). Then, for each subcomponent, the controller selects a minimum power error value from the error values (step 1406). In accordance with the illustrative embodiments, the minimum power error value is the less of the power error values. That is, the power error values may be positive or negative and the controller selects the least of the power error values as the minimum power error value.

The controller then determines whether the power is within a controllable operating region (step 1408) by determining whether either a DC cap at time T−1 (DC Cap(t−1))

is greater than or equal to a DC cap maximum (DC Cap Max) OR a Throttle at time t−1 (Throttle (t−1)) is equal to zero percent (0%) AND the selected minimum power error value at time t (error (t)) is greater than 0, which may be written as:

(DC Cap(*t*−1)≥DC Cap Max OR Throttle(*t*−1)=0%
AND error(*t*)>0 or DC cap at time T−1 (DC Cap(t−1)) is less than or equal to a DC cap minimum (DC Cap Min) OR a Throttle at time t−1 (Throttle (t−1)) is equal to 100 percent (100%) AND the selected minimum power error value at time t (error (t)) is less than 0, which may be written as:

(DC Cap(*t*−1)≤DC Cap Min OR Throttle(*t*−1)=100%
AND error(*t*)<0.

If at step 1408 either of these conditions is true, the controller causes a selection at interval t S(t) of a multiplexor to select a first input, which is an input of a zero (0). which causes the DC capper to throttle the load at a previous setting (step 1410), with the operation ending thereafter. If at step 1408 neither of the conditions are true, the controller causes a selection at time t S(t) of the multiplexor to select a second input (step 1412), which is an input of the selected minimum power error value at time t (error (t)) of step 1406. With the second input selected, the selected minimum power error value at time t (error (t)) is still in AC watts, which is not usable by a DC capper to throttle a DC load. Thus, the controller converts the selected minimum power error value at time t (error (t)) in AC Watts to an internal minimum power error value in DC watts by first multiplying the selected minimum power error value at time t (error (t)) by a factor k that is used to translate external power to internal power (step 1414).

With the internal minimum power error value determined, the controller multiplies the internal minimum power error value by the number of working power supply units (M) of the server (step 1416) resulting in an internal minimum power error value for the multiple power supply units. The controller then sums the internal minimum power error value for the multiple power supply units with a present DC power cap value that indicates how much the DC load should be throttled by the DC capper (step 1418). The summed DC power cap value is bounded by a both a DC power cap maximum (DC Cap Max) and a DC power cap minimum (DC Cap Min) such that, if the summed DC power cap value is above DC Cap Max, the DC Cap Max value is used or, if the summed DC power cap value is below DC Cap Min, the DC Cap Min value is used. Using the DC Cap Max and DC Cap Min ensures that the DC load is not throttled or over powered excessively. Therefore, after the controller determines the summed DC power cap value, the controller provides the summed DC power cap value, the DC Cap Max value, or the DC Cap Min value to the DC Capper for throttling of the DC load (step 1420). The type of throttling implemented by the DC capper may be, for example, processor clock frequency and voltage scaling, processor clock throttling, idle cycle injection, or the like. The operation ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, in one illustrative embodiment mechanisms are provided for allocating data center power to the power consumption devices with multiple power supplies more efficiently than conventional power capping solutions. Where previous implementations provide a unique power capping solution that utilizes the power distribution hierarchy and associated characteristics as well as the priority assigned to a power consumption device with one power supply in order to throttle the power consumption devices to adhere to design limitations of power distribution equipment or contractual limits, the mechanisms of the illustrative embodiments compute additional metrics that correspond to the amount of stranded power on power consumption devices with multiple power supplies and calculate the precise amount of power that may be reallocated before the power consumption devices receive and set their respective power caps, thereby resulting in an optimized power allocation.

Additionally, in another illustrative embodiment mechanisms are provided that take the allocated power budgets from each of the multiple power supplies and, when the power consumption device being fed by the multiple power supplies has multiple subcomponents, such as blades, sleds, or the like, divides the allocated power budgets among the subcomponents. That is, the mechanisms using the provided power budgets or power caps as inputs and determines appropriate power caps to apply to each subcomponent in the power consumption device, which results in each power supply running at or lower than their associated power budget.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for enforcing power caps within a power consumption device with multiple power supply units, the method comprising:
    determining a set of error values, wherein determining the set of error values comprises:
    for each power supply of the multiple power supply units:
        measuring, at each control interval t, input power supplied to the power consumption device; and
        computing an error value by determining a difference between an associated budgeted power and the measured input power measured for the power supply;
    utilizing a minimum power error value from the set of error values, multiplying the minimum power error value by a factor k to translate the minimum power error value to an internal minimum power error value;
    multiplying the internal minimum power error value by a number of working power supply units of the power consumption device, resulting in an internal minimum power error value for the multiple power supply units;
    summing the internal minimum power error value for the multiple power supply units with a present power cap value thereby forming a summed power cap value; and
    responsive to the summed power cap value being between a power cap maximum and a power cap minimum, throttling the computing load using the summed power cap value.

2. The method of claim 1, further comprising:
    responsive to the summed power cap value being above the power cap maximum and the power cap minimum, throttling the computing load using the power cap maximum.

3. The method of claim 1, further comprising:
    responsive to the summed power cap value being below the power cap maximum and the power cap minimum, throttling the computing load using the power cap minimum.

4. The method of claim 1, wherein the throttling includes at least one of processor clock frequency and voltage scaling, processor clock throttling, or idle cycle injection.

5. The method of claim 1, wherein the minimum power error value from the set of error values is the least of all the error values determined for the multiple power supply units supplying power to the power consumption device and wherein each error value in the set of error values is either positive or negative.

6. The method of claim 1, further comprising:
    determining whether power for the computing load is not controllable by:
    determining whether either a direct current (DC) cap at time T−1 (DC Cap(t−1)) is greater than or equal to a DC cap maximum (DC Cap Max) OR a Throttle at time t−1 (Throttle (t−1)) is equal to zero percent (0%) AND the minimum power error value at time t (error (t)) is greater than 0:

(DC Cap($t-1$)≥DC Cap Max OR Throttle($t-1$)=0%
        AND error($t$)>0

OR the DC cap at time T−1 (DC Cap(t−1)) is less than or equal to the DC cap minimum (DC Cap Min) OR the Throttle at time t−1 (Throttle (t−1)) is equal to 100 percent (100%) AND the minimum power error value at time t (error (t)) is less than 0:

(DC Cap($t-1$)≥DC Cap Min OR Throttle($t-1$)=100%
        AND error($t$)<0.

7. The method of claim 1, further comprising:
    responsive to the power for the computing load not being controllable, not throttling the computing load at a present throttling value.

8. The method of claim 1, wherein determining the set of error values comprises:
    for each power supply j, where j goes from 1 to m:
        estimating, at each control interval t, input power from the power supply feeding the power consumption device using the following:

$$\text{Estimate}_{i,j} = \text{PowerSupply\_Power\_In}_j \times \frac{SCMeasure_i}{\sum_{i=1...n} SCMeasure_i},$$

where PowerSupply_Power_In$_j$ is input power from the power supply j, SCMeasure$_i$ is a power consumption value provided by a respective subcomponent, and ΣSCMeasure$_i$ from 1 to n is the sum of power consumption values provided by all subcomponents; and
    computing an error value by determining a difference between the associated budgeted power received from the power capping mechanism and the estimated input power measured.

9. A computer program product comprising a non-transitory computer readable storage medium having a computer readable program for enforcing power caps within a power consumption device with multiple power supply units therein, wherein the computer readable program, when executed on a computing device, causes the computing device to:
    determine a set of error values, wherein the computer readable program determines the set of error values by causing the computing device to:
    for each power supply of the multiple power supply units:
        measure, at each control interval t, input power supplied to the power consumption device; and
        compute an error value by determining a difference between an associated budgeted power and the measured input power measured for the power supply;
    utilize a minimum power error value from the set of error values, multiplying the minimum power error value by a factor k to translate the minimum power error value to an internal minimum power error value;
    multiply the internal minimum power error value by a number of working power supply units of the power consumption device, resulting in an internal minimum power error value for the multiple power supply units;

sum the internal minimum power error value for the multiple power supply units with a present power cap value thereby forming a summed power cap value; and responsive to the summed power cap value being between a power cap maximum and a power cap minimum, throttle the computing load using the summed power cap value.

10. The computer program product of claim 9, wherein the computer readable program further causes the computing device to:

responsive to the summed power cap value being above the power cap maximum and the power cap minimum, throttle the computing load using the power cap maximum.

11. The computer program product of claim 9, wherein the computer readable program further causes the computing device to:

responsive to the summed power cap value being below the power cap maximum and the power cap minimum, throttle the computing load using the power cap minimum.

12. The computer program product of claim 9, wherein the throttle includes at least one of processor clock frequency and voltage scaling, processor clock throttling, or idle cycle injection.

13. The computer program product of claim 9, wherein the minimum power error value from the set of error values is the least of all the power error values determined for the multiple power supply units supplying power to the power consumption device and wherein each error value in the set of error values is either positive or negative.

14. The computer program product of claim 9, wherein the computer readable program further causes the computing device to:

determine whether power for the computing load is not controllable by the computer readable program further causing the computing device to:

determine whether either a direct current (DC) cap at time T−1 (DC Cap(t−1)) is greater than or equal to a DC cap maximum (DC Cap Max) OR a Throttle at time t−1 (Throttle (t−1)) is equal to zero percent (0%) AND the minimum power error value at time t (error (t)) is greater than 0:

(DC Cap(*t*−1)≥DC Cap Max OR Throttle(*t*−1)=0%
AND error(*t*)>0

OR the DC cap at time T−1 (DC Cap(t−1)) is less than or equal to the DC cap minimum (DC Cap Min) OR the Throttle at time t−1 (Throttle (t−1)) is equal to 100 percent (100%) AND the selected minimum power error value at time t (error (t)) is less than 0:

(DC Cap(*t*−1)≥DC Cap Min OR Throttle(*t*−1)=100%
AND error(*t*)<0.

15. The computer program product of claim 9, wherein the computer readable program further causes the computing device to:

responsive to the power for the computing load not being controllable, not throttle the computing load at a present throttling value.

16. The computer program product of claim 9, wherein the computer readable program determines the set of error values by causing the computing device to:

for each power supply j, where j goes from 1 to m:

estimate, at each control interval t, input power from the power supply feeding the power consumption device using the following:

$$\text{Estimate}_{i,j} = \text{PowerSupply\_Power\_In}_j \times \frac{SCMeasure_i}{\sum_{i=1...n} SCMeasure_i},$$

where PowerSupply_Power_In$_j$ is input power from the power supply j, SCMeasure$_i$ is a power consumption value provided by a respective subcomponent, and ΣSCMeasure$_i$ from 1 to n is the sum of power consumption values provided by all subcomponents; and compute an error value by determining a difference between the associated budgeted power received from the power capping mechanism and the estimated input power measured.

17. An apparatus for enforcing power caps within a power consumption device with multiple power supply units comprising:

a processor; and a memory coupled to the processor, wherein the memory comprises instructions which, when executed by the processor, cause the processor to:

determine a set of error values, wherein the computer readable program determines the set of error values by causing the computing device to:

for each power supply of the multiple power supply units:

measure, at each control interval t, input power supplied to the power consumption device; and compute an error value by determining a difference between an associated budgeted power and the measured input power measured for the power supply;

utilize a minimum power error value from the set of error values, multiplying the minimum power error value by a factor k to translate the minimum power error value to an internal minimum power error value;

multiply the internal minimum power error value by a number of working power supply units of the power consumption device, resulting in an internal minimum power error value for the multiple power supply units;

sum the internal minimum power error value for the multiple power supply units with a present power cap value thereby forming a summed power cap value; and responsive to the summed power cap value being between a power cap maximum and a power cap minimum, throttle the computing load using the summed power cap value.

18. The apparatus of claim 17, wherein the instructions further cause the processor to:

responsive to the summed power cap value being above the power cap maximum and the power cap minimum, throttle the computing load using the power cap maximum.

19. The apparatus of claim 17, wherein the instructions further cause the processor to:

responsive to the summed power cap value being below the power cap maximum and the power cap minimum, throttle the computing load using the power cap minimum.

20. The apparatus of claim 17, wherein the throttle includes at least one of processor clock frequency and voltage scaling, processor clock throttling, or idle cycle injection.

* * * * *